(12) United States Patent
Haas et al.

(10) Patent No.: US 9,891,019 B2
(45) Date of Patent: Feb. 13, 2018

(54) COMPOSITE ARCHERY RELEASE

(71) Applicant: FeraDyne Outdoors LLC, Superior, MN (US)

(72) Inventors: Matthew Peter Haas, Duluth, MN (US); Jon Arthur Syverson, Cloquet, MN (US); William Edward Pedersen, Duluth, MN (US)

(73) Assignee: FeraDyne Outdoors LLC, Superior, MN (US)

( * ) Notice: Subject to any disclaimer, the term of this patent is extended or adjusted under 35 U.S.C. 154(b) by 0 days.

(21) Appl. No.: 15/377,082

(22) Filed: Dec. 13, 2016

(65) Prior Publication Data

US 2017/0176129 A1    Jun. 22, 2017

Related U.S. Application Data

(60) Provisional application No. 62/270,333, filed on Dec. 21, 2015, provisional application No. 62/387,048, filed on Dec. 21, 2015.

(51) Int. Cl.
*F41B 5/18* (2006.01)
*F41B 5/14* (2006.01)

(52) U.S. Cl.
CPC .................... *F41B 5/1469* (2013.01)

(58) Field of Classification Search
CPC ............... F41B 5/1469; F41B 5/1426
See application file for complete search history.

(56) References Cited

U.S. PATENT DOCUMENTS

| | | | | |
|---|---|---|---|---|
| 4,612,907 A * | 9/1986 | Gantt | ............... | F41B 5/1469 124/35.2 |
| 4,724,821 A * | 2/1988 | Besaw | ............... | F41B 5/1469 124/35.2 |
| 5,027,786 A * | 7/1991 | Peck | ............... | F41B 5/1469 124/35.2 |
| 5,263,466 A * | 11/1993 | Peck | ............... | F41B 5/1469 124/35.2 |
| 6,257,219 B1 * | 7/2001 | McPherson | ............... | F41B 5/10 124/25.6 |
| 6,964,271 B2 * | 11/2005 | Andrews | ............... | F41B 5/10 124/25.6 |

(Continued)

*Primary Examiner* — John Ricci
(74) *Attorney, Agent, or Firm* — Winthrop & Weinstine, P.A.

(57) ABSTRACT

An archery release configured to eliminate, or at least minimize, vibrations and/or noise generated when a drawn bowstring is released from a pre-shoot position. The archery release includes a substrate subassembly and an overmolding material bonded to each other. The overmolding material is configured to absorb and eliminate, or at least minimize the vibrations and/or noise. The archery release also includes a trigger, a release mechanism, and a latching assembly extending into a hollow interior of a handle of the archery release. Within the handle, the latching assembly is operably coupled with the trigger and with the release mechanism. The vibrations and/or noise is eliminated, or at least minimized, by placing the overmolding material at locations whereat one or more components of the trigger, the latching assembly, and the release mechanism strike or engage the overmolding material instead of the substrate subassembly.

15 Claims, 24 Drawing Sheets

(56) References Cited

U.S. PATENT DOCUMENTS

| | | | |
|---|---|---|---|
| 7,926,475 B2* | 4/2011 | Jones | F41B 5/1469 |
| | | | 124/35.2 |
| 2006/0180135 A1* | 8/2006 | Andrews | F41B 5/1426 |
| | | | 124/89 |

* cited by examiner

COMPOSITE ARCHERY RELEASE

CROSS-REFERENCE TO RELATED APPLICATIONS

This application claims the benefit of U.S. Provisional Patent Application No. 62/270,333 filed Dec. 21, 2015, and U.S. Provisional Patent Application No. 62/387,048 filed Dec. 21, 2015, which are hereby incorporated by reference in their entirety.

STATEMENT REGARDING FEDERALLY SPONSORED RESEARCH OR DEVELOPMENT

Not applicable.

TECHNICAL FIELD

The instant disclosure relates to an archery release, and in particular to a composite archery release for drawing and releasing a bowstring.

BACKGROUND

Release devices are used in archery to assist the archer in pulling a bowstring to a fully drawn position and then releasing the bowstring to shoot an arrow. The release devices typically include a handle made from a rigid lightweight metal. The archer attaches the release to the bowstring, grasps the handle with a shooting hand, draws the bowstring to a firing position, and then activates a trigger or triggering mechanism to release the bowstring to shoot the arrow a target.

Such release devices generally include metallic components housed within the handle. At least some of the internal metallic components move and contact each other and/or the handle when the bowstring is drawn to a firing position, and/or when the bowstring is released. When the metallic components contact each other, undue sound and vibration is generated which reduces the smooth feel of shooting and potentially alert the target.

Therefore, there exists a need for archery devices wherein undue sound and vibration are eliminated or at least minimized.

SUMMARY

A non-limiting exemplary embodiment of an archery release includes a handle, a trigger, a release mechanism, and a latching assembly. The handle includes substantially symmetrical front and rear portions, each having a substrate subassembly having an exterior surface, spaced-apart front and back sides, a cavity in the back side, and one or more troughs on the exterior surface, wherein each of the one or more troughs and the cavity are connected by at least one passage. An overmolding material is disposed within at least a portion of the cavity, each of the one or more troughs, and each of the at least one passage. The handle includes a hollow interior defined at least in part by the portion of the cavity devoid of the overmolding material. At least a portion of the trigger, the latching assembly, and the release mechanism extend into the interior of the handle, wherein the latching assembly is operably coupled with the trigger and with the release mechanism.

A non-limiting exemplary embodiment of a method of forming an exemplary embodiment of an archery release includes providing substantially symmetrical front and rear portions, providing an overmolding material, placing the substrate in a mold cavity, injecting the molding material into the mold cavity, and overmolding at least a portion of the substrate subassembly with the overmolding material.

DETAILED DESCRIPTION

One or more non-limiting embodiments are described herein with reference to the accompanying drawings, wherein like elements are designated by like numerals. It should be clearly understood that there is no intent, implied or otherwise, to limit the disclosure in any way, shape or form to the embodiments illustrated and described herein. While multiple exemplary embodiments are described, variations thereof will become apparent or obvious to a person of ordinary skill. Therefore, any and all variants of components providing functionalities substantively similar to those of the illustrated and described embodiments are considered as being within the metes and bounds of the instant disclosure.

As is well known in the art, conventional archery releases do not include vibration and/or sound dampening material and, consequently, vibrations generated by their mechanical components during operation generally get transmitted to the handle of the archery release. The interaction of the mechanical components during use also generates sound that is audible external of the archery release.

The instant disclosure is directed to non-limiting exemplary embodiments of an archery release and methods for manufacturing the same wherein the handle is overmolded with a vibration and sound dampening material configured for eliminating, or minimizing, sounds and vibrations when a bowstring is drawn to a pre-shoot position and released. Non-limiting exemplary embodiments of the archery release disclosed herein include configurations or arrangements wherein the overmolding material and at least some of the mechanical components of the archery release contact each other whereby consequential vibrations and/or sounds are dissipated or absorbed by the overmolding material.

Figure 1:
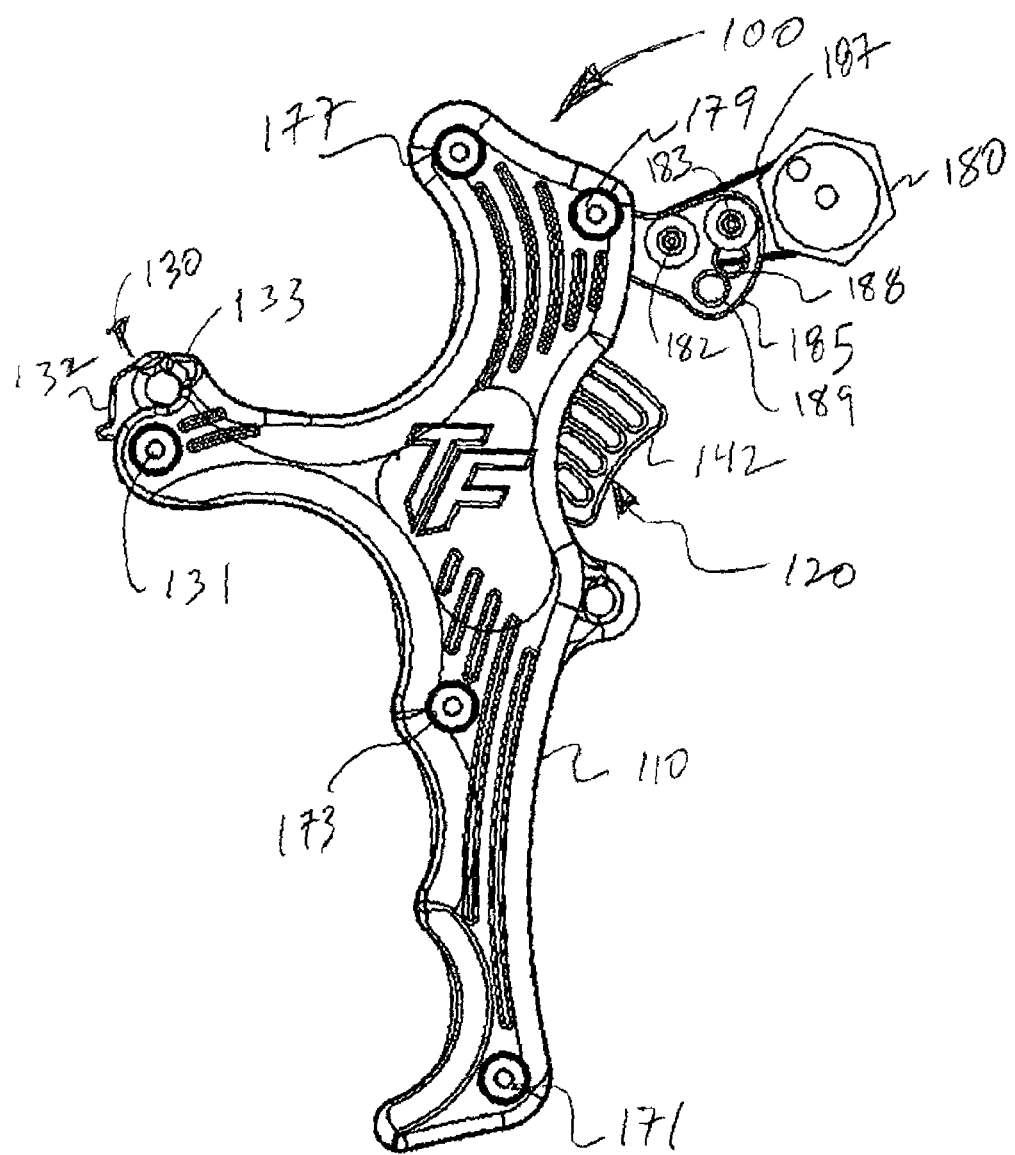
FIG. 1 illustrates a non-limiting exemplary embodiment of a hand-held composite archery release.

FIG. 1 illustrates a non-limiting exemplary embodiment of an archery release 100. In some embodiments, the archery release is a composite of two or more material. The archery release 100 illustrated in FIG. 1 includes a handle 110 and a latching assembly 120. In certain embodiments, the latching assembly 120 is configured to operate in conjunction with a bowstring retention and release mechanism 130 ("release mechanism 130" hereinafter)

Figure 2:
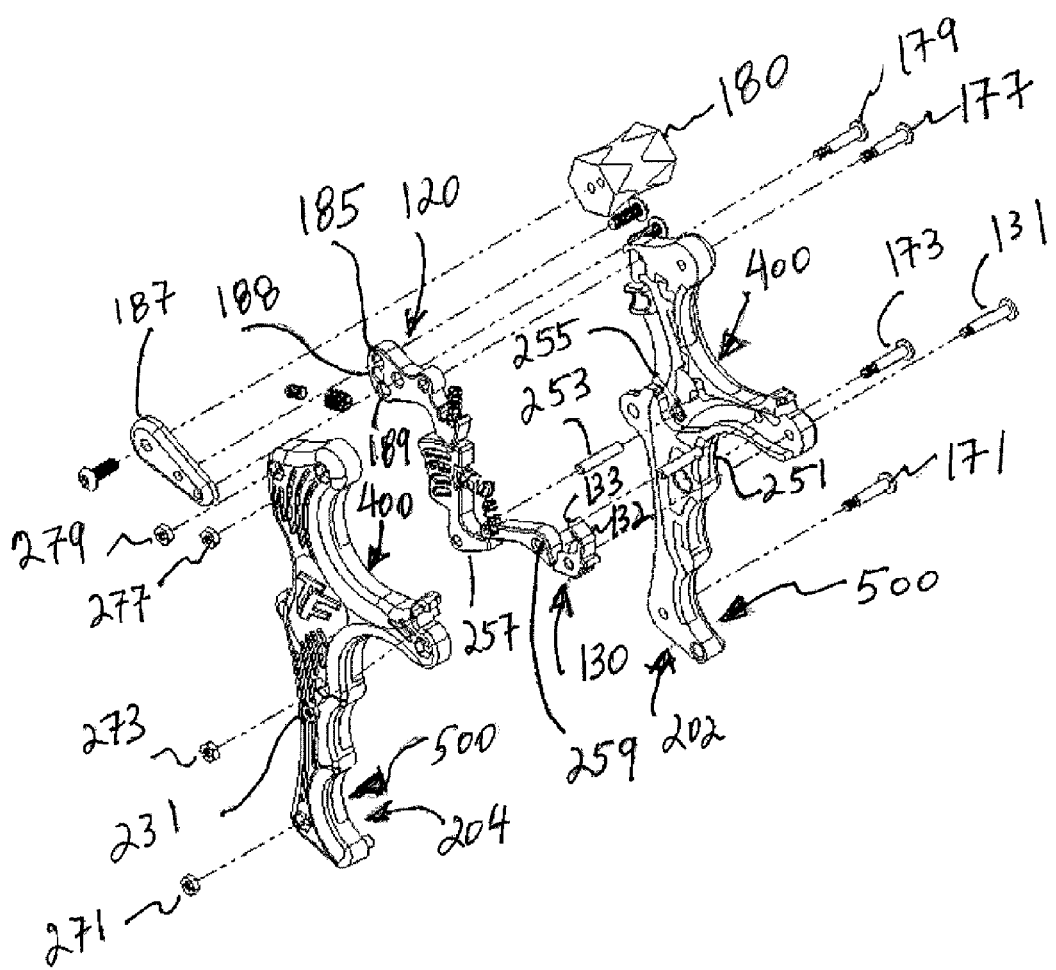
FIG. 2 is a perspective view of the archery release of FIG. 1 in a dis-assembled state.

The release mechanism 130 is affixed to the handle 110 via a hinge pin 131. The release mechanism 130 includes a hinged release 132 and a bowstring hook 133. In some embodiments, the hinged release 132 and the bowstring hook 133 are integral. In certain embodiments, the hinged release 132 and the bowstring hook 133 are mechanically coupled components. The hinge pin 131 enables or facilitates the hinged release 132 to pivot along an axis defined by the hinge pin 131. In some embodiments, the hinge pin 131 serves the dual function of fastening the latching assembly 120, a front portion 202, and a rear portion 204 to each other. In certain non-limiting exemplary embodiments, such as that illustrated in FIG. 2 for instance, the front portion 202 and rear portion 204 are constructed as mirror images of each other. Consequently, as illustrated in FIG. 2, at least a portion of the latching assemble 120 is sandwiched or housed between the front and rear portions 202 and 204, respectively. In certain embodiments, one or more securement devices or means, for example bolts 171, 173, 177 and 179 and respective nuts 271, 273, 277 and 279, are provided for fastening or attaching the front and rear portions 202 and 204 to each other. In some embodiments, the bolt 179 is also functional as a hinge pin for a trigger 180.

Figure 3A:
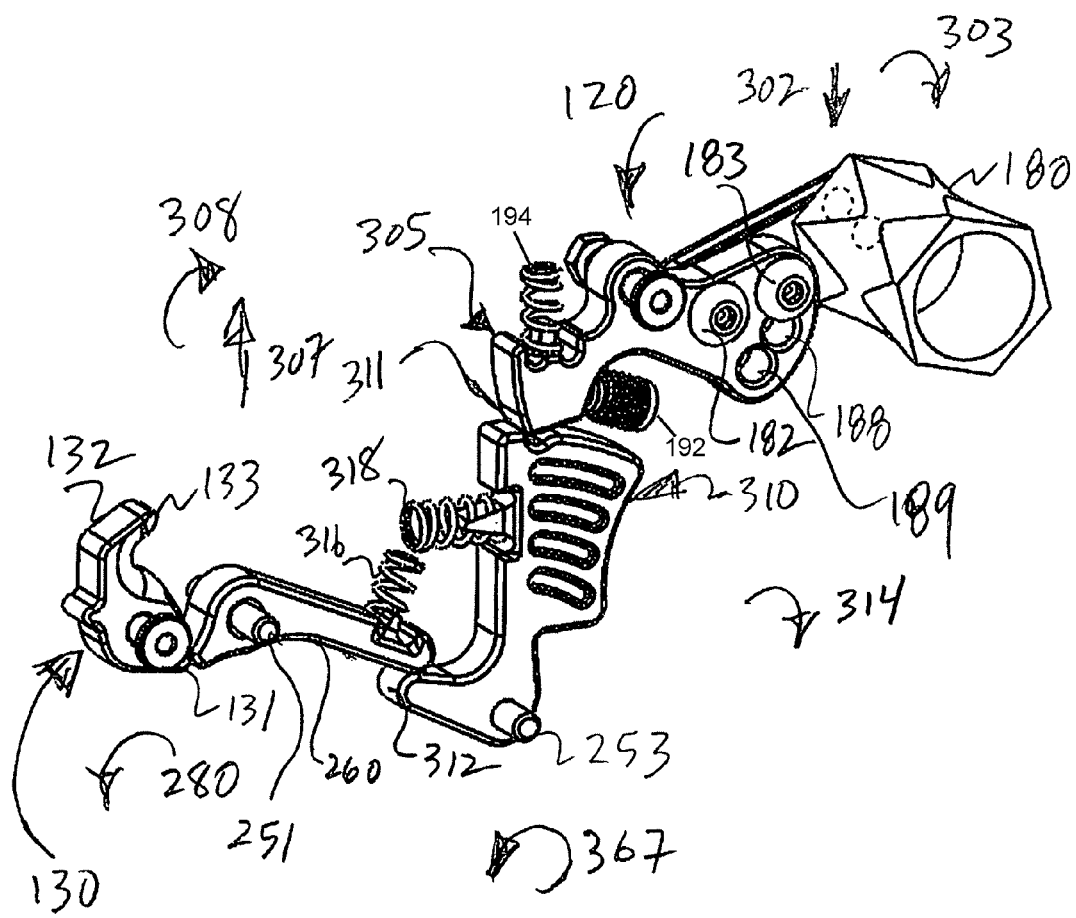
FIG. 3A is a perspective view illustrating at least some of the internal components of the archery release illustrated in FIG. 1 in a pre-shoot locked state.

In a non-limiting exemplary embodiment, such as that illustrated in FIG. 1 for instance, the latching assembly 120 includes an actuator 142 which is shown extending outwardly away from the handle 110. In some embodiments, when the actuator 142 is in such the outwardly extending position, a bowstring hook 133 is enabled to rotate freely about the hinge pin 131. When the actuator 142 is depressed towards the handle 110, at least a portion thereof extends inwardly and is housed between the front and rear portions 202 and 204. When the entirety of the actuator 142 is pushed inwardly into the handle 110, the bowstring hook 133 is locked into position, such as shown in FIG. 3A for instance, to retain or hold a bowstring. The bowstring is then drawn by pulling the handle 110 away from the bow and towards the archer. As described below, when the entirety of the actuator 142 is pushed inwardly into the handle 110, a thumb sear 310, which is an integral part of the actuator 142, and a trigger sear 305, which is an integral part of the latching assemble 120, engage each other at the sear engagement illustrated at numeral 311.

In some non-limiting exemplary embodiments, biasing elements 192 and 194, such as springs for example, are provided to ease the movement of the trigger sear 305 towards and away from the sear engagement 311. When the archery release 100 is in the pre-shoot locked position, i.e., when the trigger sear 305 and the thumb sear 310 are engage, such as at sear engagement 311, the biasing element 192 is in a compressed state. When the trigger 180 is operated to release the bowstring, the compressive forces or energy stored in the biasing element 192 aid in rotating the trigger 180 such that less force is required to operate the trigger 180 relative to the force required in the absence of the biasing element 192. The biasing element 192 also aids in keeping the trigger sear 305 disengaged and displaced away from the thumb sear 310. As such, the archery release 100 is in the post-shoot position, and the biasing element 194 is in a compressed state. When the actuator 142 is pushed towards and inwardly into the housing 110 and the trigger 180 is in the post-shoot position, the compressive force or energy stored in the biasing element 194 causes the trigger sear 305 to rotate towards, and engage with, the thumb sear 310. When the trigger sear 305 and the thumb sear 310 are engaged with each other at sear engagement 311, the archery release 100 is considered to be in the pre-shoot locked position. In certain non-limiting exemplary embodiments, a biasing element 316, such as a spring for example, is provided for rotating the actuator 142 outwardly from the housing 100 when released by the user. When the user pushes the actuator 142 towards the housing 110, the biasing element 318 is placed in a compressed state. Then, when the user releases the actuator 142, the compressive energy or force stored in the compresses biasing element 318 is release causing the actuator 142 to rotate about the sleeve 253 and pushing the actuator 142 out of the housing 110. In some non-limiting exemplary embodiments, a biasing element 316, such as a spring for example, is provided for rotating the lever arm 260 about the sleeve 251. Releasing the actuator 142 causes the actuator 412 to rotate about the sleeve 253 which in turn cause an end 312 of the thumb sear assembly 310 to apply a force at an end of the lever arm 260. The lever arm 260 is rotated about the sleeve 251 and the biasing element 316 is placed in a compressed state.

In a non-limiting exemplary embodiments, the biasing element 192, such as a spring for example, is used to set or adjust the "travel" of the trigger 180. As will be apparent to one skilled in the art, the "travel" will be defined at least in part by the mechanical properties of the biasing element 192. For example, if the biasing element 192 is a spring, then the "stiffness" of the spring, i.e., the spring constant, will affect the "travel" of the trigger 180.

In a non-limiting exemplary embodiment, an adjustment means (not shown), such as a set screw for example, is operatively coupled to the biasing element 192 for adjusting and/or fine-tuning the "travel" of the trigger 180. In some embodiments, the adjustment means extends through an opening in the body of the handle 110, and operatively couples with the biasing element 192.

In a non-limiting exemplary embodiment, the element 192 is not a biasing element. As such, the element 192 can still be used for setting and/or adjusting the "travel" of the trigger 180. For example, in some embodiments, the element 192 is configured as a "post" or a "stop". In certain embodiments, the element 192 is adjustable.

In some non-limiting exemplary embodiments, the trigger 180 is attached to an adjustable pulling post arm 187 using a securement device or means such as, but not limited to, a screw for example. In the illustrated embodiments, the adjustable pulling post arm 187 is secured to an adjustable post 185 using a securement device or means such as, but not limited to, screws 182 and 183 for example. In certain embodiments, the securement devices or means, i.e., the screws 182 and 183, are used to relocate and attach the adjustable pulling post arm 187 to one of holes 186, 188 and 189 of the adjustable post 185. In other words, the position of the trigger 180 relative to the handle 110 and/or the latching assembly 120 is adjustable by locating the pulling post arm 187 to one of holes 186, 188 and 189 of the adjustable post 185.

In a non-limiting exemplary embodiment, a biasing element 194, such as a spring for example, is used to adjust the amount of force required to "pull" the trigger 180. As will be apparent to one skilled in the art, the amount of force required to "pull" the trigger 180 will be defined at least in part by the mechanical properties of the biasing element 194. For example, if the biasing element 194 is a spring, then the "stiffness" of the spring, i.e., the spring constant, will affect the amount of force required to "pull" the trigger 180.

In a non-limiting exemplary embodiment, an adjustment means (not shown), such as a set screw for example, is operatively coupled to the biasing element 194 for adjusting and/or fine-tuning the amount of force required to "pull" the trigger 180. In some embodiments, the adjustment means extends through an opening in the body of the handle 110, and operatively couples with the biasing element 194.

In use, an archer uses the archery release 100 to draw a bowstring to a shooting position and then operate the trigger 180 to release the bowstring. The archer pushes the actuator 142 to an inward position, towards handle 110, which locks the trigger 180 in a pre-shoot or pre-firing position, and also locks the bowstring hook 133. With the bowstring retained in the locked bowstring hook 133, the archer pulls the handle 110 back (towards the archer) to a shooting position. It will be appreciated that with the bowstring hook 133 in the locked position, the bowstring is retained or maintained within the bowstring hook 133 until such time as the bowstring hook 133 is released from the locked position.

When the archery release 100 is in a pre-shoot shooting position with the bowstring fully drawn, and the archer is ready to release the bowstring, and the arrow, the archer presses the trigger 180 towards the handle 110. This activates a series of spring loaded mechanisms housed within the handle 110 and associated with the latching assembly 120 and the release mechanism 130. The spring loaded internal mechanisms, as shown in FIG. 3, at least in part include a trigger sear 305, a thumb sear 310, and a lever arm 260. Movement of these internal mechanisms disengages the releases mechanism 130 from the locked position which, in turn, allows the bowstring hook 133 to rotate about the hinge pin 131 in the direction indicated by the arrow 280. The rotation of the bowstring hook 133 about hinge pin 131 releases the bowstring from the handle 110.

FIG. 2 is a perspective view of the archery release 100 in a disassembled state illustrating the various components and their relative locations, including those housed within the handle 110, and the manner in which the archery release 100 is assembled. The handle 110 is shown as having a front portion 202 and a rear portion 204. One or more securement devices or means are used for assembling the archery release. One such securement device or means includes the hinge pin 131 and a fastener 231. As illustrated, at least an end portion of the hinge pin 131 is configured having threads to which the fastener 231 attaches. In some non-limiting exemplary embodiments, sleeves 251 and 253 are provided for securing and aligning the latching assembly 120 within handle 110 by, for example, using cutouts 255 on an interior portion of the front and rear portions 202 and 204, respectively, and cutouts 257 and 259 on the latching assembly 120. In some embodiments, one or more of the components used for the latching assembly 120 and/or for the release mechanism 130 is made from steel, stainless steel, or brass.

FIG. 3A is a detailed perspective view of the latching assembly 120 and the release mechanism 130 illustrating at least some of their respective components housed within the handle 110. In particular, FIG. 3A illustrates the relative positions of the components when the archery release 100 is in the pre-shoot locked position. As such, FIG. 3A shows the latching assembly 120 and the release mechanism 130 in the locked position, which occurs when the archer presses or pushes the latching assembly 120 towards the body of the handle 110. When the latching assembly 120 is so displaced, the spring 318 gets compressed and stores energy therein.

Figure 3B:
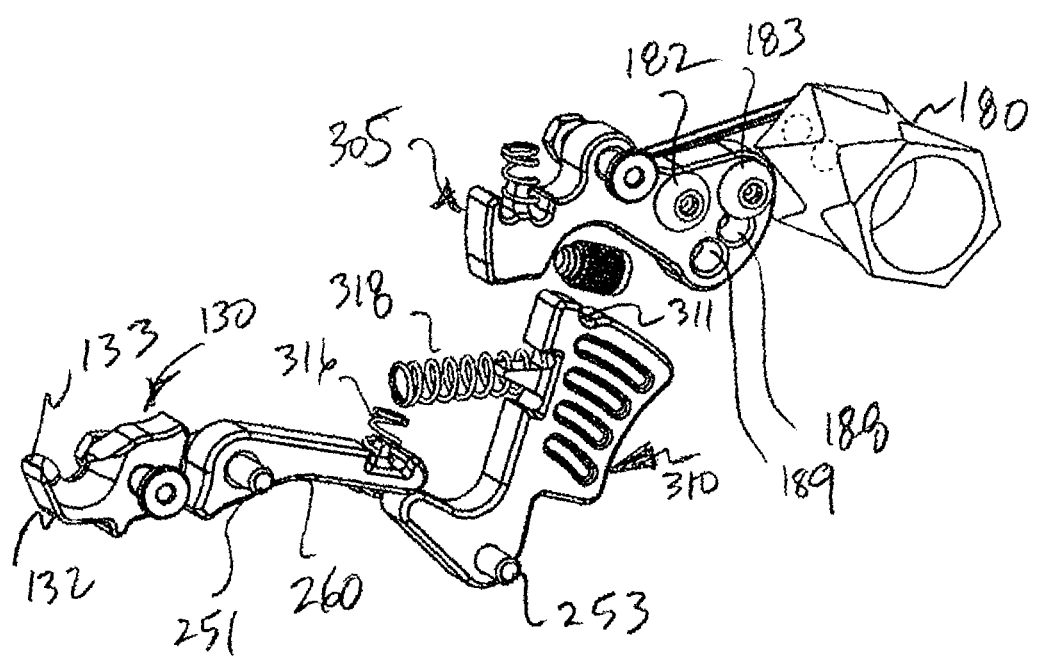
FIG. 3B is a perspective view illustrating at least some of the internal components of the archery release illustrated in FIG. 1 in a post-shoot state.

In use, at least the trigger sear 305, the thumb sear 310, the sear engagement illustrated at numeral 311, and the lever arm 260 are the primary elements that hold the trigger 180 and the release mechanism 130 in place. With the latching assembly 120 and the release mechanism 130 in the locked pre-shoot position, the archer presses or pushes the trigger 180 in the direction of arrow 302 causing the trigger 180 to rotate in the direction of arrow 303. When sufficient pressure is applied to the trigger 130, the release mechanism 130 is actuated to release the bowstring. The movement of the trigger 180, as described, causes the trigger sear 305 to move in the direction of arrow 307 causing the trigger sear 305 to rotate in the direction of arrow 308. This rotational movement of the trigger sear 305 releases the sear engagement, illustrated by the numeral 311, between the trigger sear 305 and the thumb sear 310. When the sear engagement 311 is released, the trigger sear 305 and the thumb sear 310 disengage, and the compressive force stored in the spring 318 is released causing the thumb sear 310 to rotate about the sleeve 253 in the direction shown by the arrow 314. The rotational movement of the thumb sear 310 causes the lever arm 260 to rotate about sleeve 251 in the direction shown by the arrow 367. The rotational movement of the lever arm 260 allows the drawn bowstring to cause or impart rotational movement of the release mechanism 130 about the hinge pin 131 in the direction shown by the arrow 280. This rotational movement of the release mechanism 130 releases the drawn bowstring from the bowstring hook 133. FIG. 3B shows FIG. 3A in a post-shoot position.

FIG. 3B is a detailed perspective view of the relative positions of at least some of the components of the latching assembly 120 and the release mechanism 130 when the archery release is in the post-shoot position, i.e., after the drawn bowstring has been released. In particular, FIG. 3B illustrates the latching assembly 120 and the release mechanism 130 after the archer has operated the trigger 180 and released the drawn bowstring.

Figures 4A, 4B:
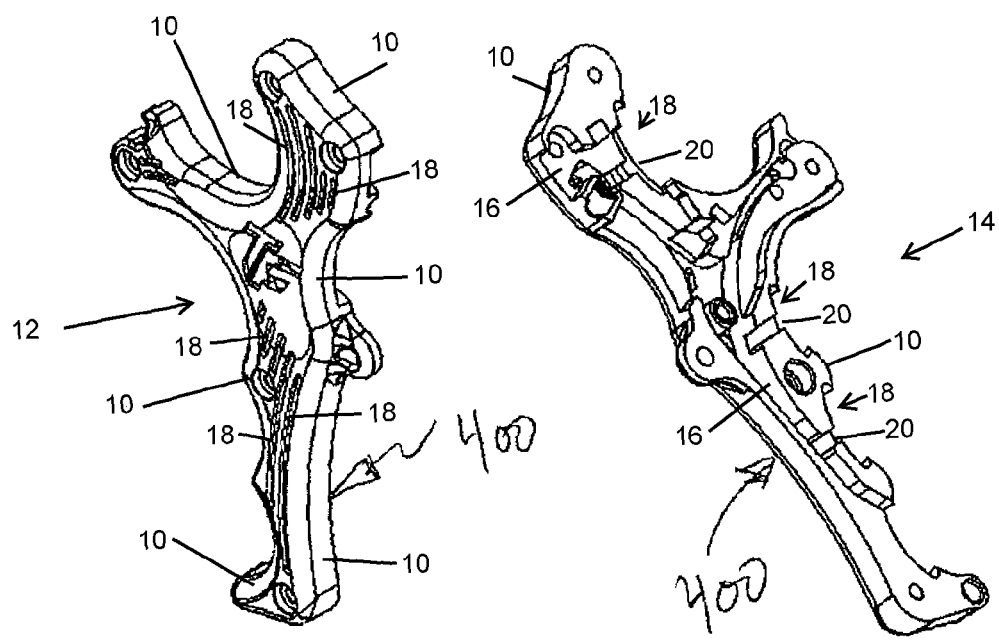
FIG. 4A is a perspective view of a front (or external) side of a non-limiting exemplary embodiment of a substrate subassembly component of a front portion of the archery release illustrated in FIG. 1.
FIG. 4B is a perspective view of a back side (or interior) of the substrate subassembly illustrated in FIG. 4A.

FIG. 4A is a perspective view of the front or external side 12 of a non-limiting exemplary embodiment of a substrate subassembly 400 for the front portion 202. FIG. 4B is a perspective view of the back (or internal or rear) side 14 of the substrate subassembly 400 illustrated in FIG. 4A. As stated elsewhere, the front portion 202 and the rear portion 204 are mirror images of each other. As such, the substrate subassembly for the rear portion 204 is a mirror image of, and substantially similar to, the substrate subassembly 400 of the front portion 202.

In a non-limiting exemplary embodiment, the substrate subassembly 400 includes an exterior surface 10 and spaced apart front or external side 12 and back (or internal or rear) side 14. The back side 14 includes a cavity 16 and one or more troughs 18 on the exterior surface 10 of the substrate subassembly 400. At least one passage 20 extends between and connects the cavity 16 and the one or more troughs 18 to each other. The handle 110 includes a hollow interior 22, as illustrated in FIG. 6D, defined at least in part by the portion of the cavity 16 that is devoid of the overmolding material 500.

In a non-limiting exemplary embodiment, injection molding or compression molding is used to manufacture the substrate subassembly 400. In some embodiments, the substrate subassembly 400 is made from a material such as polymers or composites such as, but not limited to: (i) high-density polyethylene (HDPE); (ii) ultra-high-molecular-weight polyethylene (UHMWPE); (iii) Acetal; (iv) polyamide; (v) polymethyl methacrylate (PMMA); (vi) polyether ether ketone (PEEK); (vii) Polypropylene (PP); or any combination thereof. In certain non-limiting exemplary embodiments, the material used for manufacturing the substrate subassembly 400 is not reinforced. In some non-limiting exemplary embodiments, the material used for manufacturing the substrate subassembly 400 is reinforced with carbon and/or glass fibers. For example, in some embodiments, a polyamide material reinforced with carbon fibers is used for manufacturing an exemplary embodiment of the substrate subassembly 400.

It will be appreciated that in a non-limiting exemplary embodiment, it is desirable for the substrate subassembly 400 have a relatively high stiffness. In some embodiments, a nylon based material reinforced with carbon fiber is used for manufacturing the substrate subassembly 400. Because nylon is generally difficult to bond with, it is often desired to pretreat the nylon based substrate subassembly 400 prior to bonding it with the overmolding material. Methods of pre-treatment, as are well known in the art, include plasma treating, flame treating or chemically treating the surface of the substrate subassembly 400 to expose bonding sites for the overmolding material to adhere to. In certain embodiments, an overmolding material such as, but not limited to, a polyether-based thermoplastic polyurethane (TPU) containing a plasticizer, for example Elastollan® 1175AW having a 75 Shore A durometer and particularly known for adhering to pretreated nylon 6, is used for overmolding a pretreated substrate subassembly 400.

In an exemplary embodiment, RTP 287 composed of nylon 6 and 40% carbon fiber is used for the substrate subassembly 400. For some non-limiting exemplary embodiments of the archery release 100, RTP 287 is preferred because of its high stiffness (>$2.0*10^6$ psi in tension), and high strength (>30,000 psi in tension). RTP 287 is generally processed with an injection pressure of greater than 10,000 psi, a melt temperature of approximately 500° F., and a mold temperature of 150°-200° F. Because RTP 287 includes nylon, it may be desirable to dry the compound, prior to molding, for approximately two hours at 180° F. to reduce its water content.

In a non-limiting exemplary embodiment, the substrate subassembly 400 is machined or cast from metals such as, but not limited to: (i) aluminum alloys; (ii) copper alloys; (iii) brass or bronze; (iv) titanium; (v) steel; (vi) stainless steel; (vii) zinc alloy; and (viii) magnesium alloy. In some non-limiting exemplary embodiments, the substrate subassembly 400 is a single piece body that is machined or cast from at least one of metals (i)-(viii).

In a non-limiting exemplary embodiment, die casting is used for manufacturing the substrate subassembly 400 using material such as, but not limited to: a zinc alloy, an aluminum alloy, or a magnesium alloy. In some embodiments, zinc alloys such as Zamak 2, Zamak 3, Zamak 5, Zamak 7, ZA-8, and ZA-27, cast at a temperature of approximately 760° F. are used. In some embodiments, aluminum alloys such as A413, A383, A390, A360, and A380, cast at a temperature of approximately 1,220° F. are used. In certain embodiments, magnesium alloys such as AZ91 and AZ61 cast at a temperature of approximately 1,400° F. are used.

In a non-limiting exemplary embodiment, the substrate subassembly 400 is manufactured using well known processes such as metal injection molding (MIM) or powder metallurgy techniques. Non-limiting exemplary embodiments of materials suitable for metal injection molding or powder metallurgy techniques include, but not limited to: (i) stainless steel; (ii) titanium; (iii) brass; and (iv) bronze.

In a non-limiting exemplary embodiment, the substrate subassembly 400 is manufactured by MIM using a material such as, but not limited to: 17-4 PH (precipitation hardening grade) stainless steel; 420 stainless steel; 316 stainless steel; and 440 stainless steel. After injection molding, the binder is cooked off from the molded part ("green part") to make a "brown part" as is known in the art. The brown part is then sintered at approximately 2,300°-2,500° F. to remove air and densify the part. In a non-limiting exemplary embodiment, the substrate subassembly 400 is manufactured by powder injection molding using a material such as, but not limited to: 304 stainless steel; 316 stainless steel; FN-0208 steel; and FLN-4205 steel. In an exemplary embodiment, these material are sintered at approximately 2,300°-2500° F.

Figures 5A, 5B:
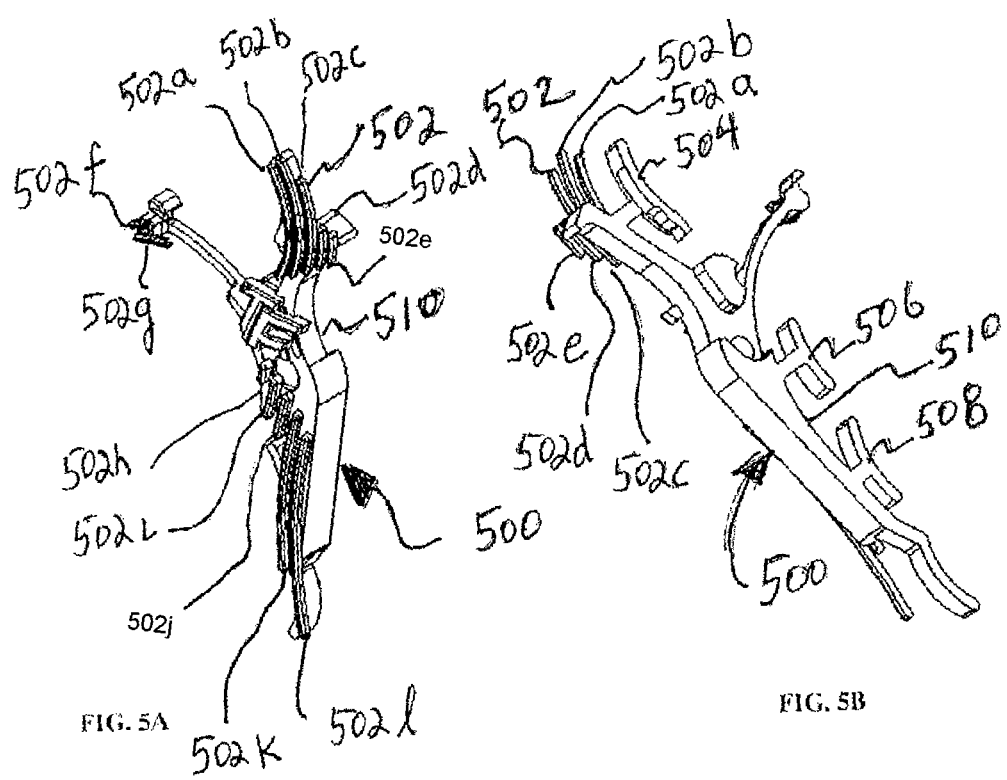
FIG. 5A is a perspective view of a front (or external) side of a non-limiting exemplary embodiment illustrating an overmolding material component of a front portion of the archery release illustrated in FIG. 1
FIG. 5B is a perspective view of a back side (or interior) of the overmolding material illustrated in FIG. 5A.

FIG. 5A is a perspective view of the front or external side of a non-limiting exemplary embodiment of the overmolding material 500 for the front portion 202. FIG. 5B is a perspective view of the reverse (or internal or rear) side of the overmolding material 500 illustrated in FIG. 5A. As stated elsewhere, the front portion 202 and the rear portion 204 are mirror images of each other. As such, the overmolding material for the rear portion 204 is a mirror image of, and substantially similar to, the overmolding material 500 of the front portion 202. In a non-limiting exemplary embodiment, a material capable of eliminating, or at least decreasing or minimizing, sound and vibrations generated when using the archery release 100 is used for overmolding the substrate subassembly 400. In some non-limiting exemplary embodiments, conventional injection molding or compression molding techniques are used for overmolding the substrate subassembly 400.

In general, overmolding is a process wherein two (or more) materials are molded together. The overmolding material 500 is chemically bonded to the substrate subassembly 400. When the archery release 100 is used for drawing and releasing the bowstring, vibrations and sound is generated by the operation of the various components of the latching assembly 120 and the release mechanism 130 housed within the handle 110. In a non-limiting exemplary embodiment, the bonding between the substrate subassembly 400 and the overmolding material 500 facilitates the transmission or transfer of the vibrations and sound generated within the handle 110 to the overmolding material 500 via the substrate subassembly 400. In a non-limiting exemplary embodiment, the overmolding material 500 absorbs and eliminates all the vibrations and sound resulting in a smooth and quiet operation of the archery release 100. In some embodiments, the overmolding material 500 dampens and mitigates at least some of the vibrations and the sound. In addition, the bonding between the overmolding material 500 and the substrate 400 enhances the structural integrity of the front and rear portions 202 and 204, and of the handle 110.

In some non-limiting exemplary embodiments, overmolding is accomplished by an injection molding process where one material (e.g., a TPE) is molded onto a second material (e.g., a rigid plastic). In certain non-limiting exemplary embodiments, overmolding is accomplished by compression molding wherein the material is placed directly into the mold, heated, and then applying a clamp force. In some non-limiting exemplary embodiments, a two-shot sequential overmolding process is used, wherein a first material is injected into a first closed cavity of a molding machine to create a first component. Next, the mold or cores are moved to create a second cavity. Then, using the first component as an insert, a second material is "shot" into the second cavity for overmolding with the first component. In some embodiments, the first and second material are different from each other. In certain embodiments, the first and second material are substantially same or substantially different. In some embodiments, the first and second material are same. In certain non-limiting exemplary embodiments, a multi-shot injection molding process is used wherein multiple materials are injected into various mold cavities during the same molding cycle. In some non-limiting exemplary embodiments, an insert overmolding process is used wherein first a pre-molded insert is placed into the mold and then a second material is injected into the mold for overmolding the pre-molded insert.

In a non-limiting exemplary embodiment, both the front and rear portions 202 and 204 of the handle 110 are manufactured using a sequential molding technique. For example, in some embodiments as described herein below with reference to FIGS. 5A and 5B, sequential molding is used to manufacture at least some portions of the overmolding material 500 which are internal to the substrate subassembly 400, such as a runner 510 that connects the inner bumpers 504, 506 and 508. Sequential molding is also used for manufacturing at least some portions of the overmolding material 500 which are external to the substrate subassembly 400, such as outer ribs or grips 502 having grip portions 502*a*-502*l*. In certain embodiments, these internal and external portions of the overmolding material for the front and rear portions 202 and 205 are configured and positioned for mechanically interlocking the overmolding materials and the substrate subassemblies with each other. Such interlocking contributes to the structural integrity and cohesiveness of the front and rear portions 202 and 204 of the handle 110.

FIGS. 1 and 6A-6D illustrate a non-limiting exemplary embodiment of a mechanically interlocked substrate subassembly 400 and overmolding material 500. In the illustrated embodiment, the grips 502 of the overmolding material 500 are positioned externally of the substrate subassembly 400, and the inner bumpers 504, 506 and 508, and the runner 510 of the overmolding material 500 are positioned internally of the substrate subassembly 400. Such internal and external positioning of the grips 502, the inner bumpers 504, 506 and 508, and the runner 510 mechanically interlocks the substrate subassembly 400 between the grips 502, the inner bumpers 504, 506 and 508, and the runner 510 such that the substrate subassembly 400 cannot be removed or taken apart from the overmolding material 500 without physically damaging its structure. For example, attempting to remove or take the substrate subassembly 400 apart from the overmolding material 500 could tear the grips 502 from the overmolding material 500.

FIGS. 5A and 5B illustrate a non-limiting exemplary embodiment of the overmolding material 500 having the grips 502, the inner bumpers 504, 506 and 508, and the runner 510. The runner 510 connects the grips 502 and the inner bumpers 504, 506 and 508 to each other. In some embodiments, the grips 502 include a plurality of grip segments or portions 502*a*-502*l* having arcuate surfaces. The integrally connected grips 502, i.e., the grip segments 502*a*-502*l*, and the runner 510 provide a degree of structural integrity and inhibits separation of the grips 502, i.e., the grip segments 502*a*-502*l*, and the substrate material 400 from each other without physically damaging or breaking these components from the overmolding material 500.

In a non-limiting exemplary embodiment, the overmolding material 500 is made from material such as, but not limited to: (i) polyurethanes (TPUs); (ii) thermoplastic elastomers (TPEs); (iii) silicone; (iv) ethylene propylene diene monomer (EPDM); (v) nitrile rubber; and (vi) butyl rubber. In a non-limiting exemplary embodiment, the front and rear portions 202 and 204 are formed by an injection molding or compression molding process wherein the substrate subassembly 400 is first placed into a mold cavity and the overmolding material 500 is then injected under heat and pressure onto and into the substrate subassembly 400.

In a non-limiting exemplary embodiment, an overmolding material 500 having a durometer of between approximately 70-90 on the Shore A scale is used to provide a desired tactile feel and coefficient of friction of the grips 502, i.e., the grip segments 502*a*-502*l*. in some embodiments, an overmolding material 500 having a 75 A durometer, such as for example Versaflex OM 6275-1, is used. In some embodiments, a material such as Versaflex OM 6275-1 is molded with at a melt temperature of approximately 500° F. and a mold temperature of approximately 60°-70° C.

As discussed elsewhere, overmolding the overmolding material 500 directly onto and into the substrate subassembly 400 will produce a strong adhesion and retention of the overmolding material 500, since it will have direct and full contact with the substrate subassembly 400, as well as being mechanically locked in place.

Figures 6A, 6B:
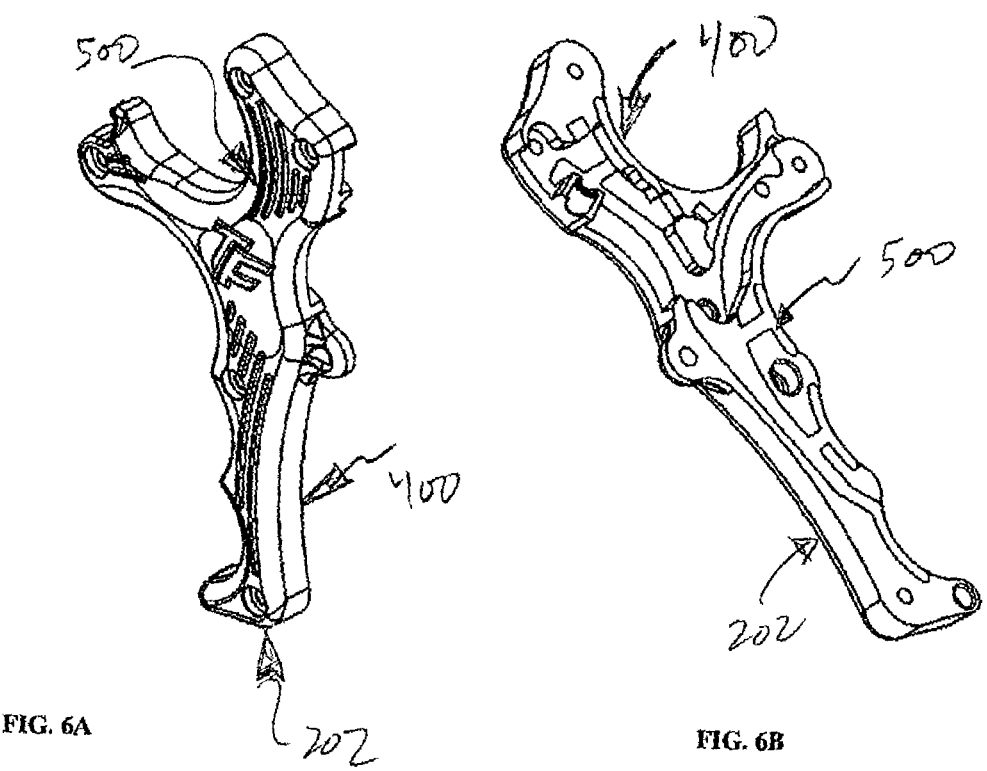
FIG. 6A is a perspective view of a front (or external) side of the front portion of the archery release illustrated in FIG. 1.
FIG. 6B is a perspective view of a back side (or interior) of the front portion illustrated in FIG. 6A.
Figures 6C, 6D:
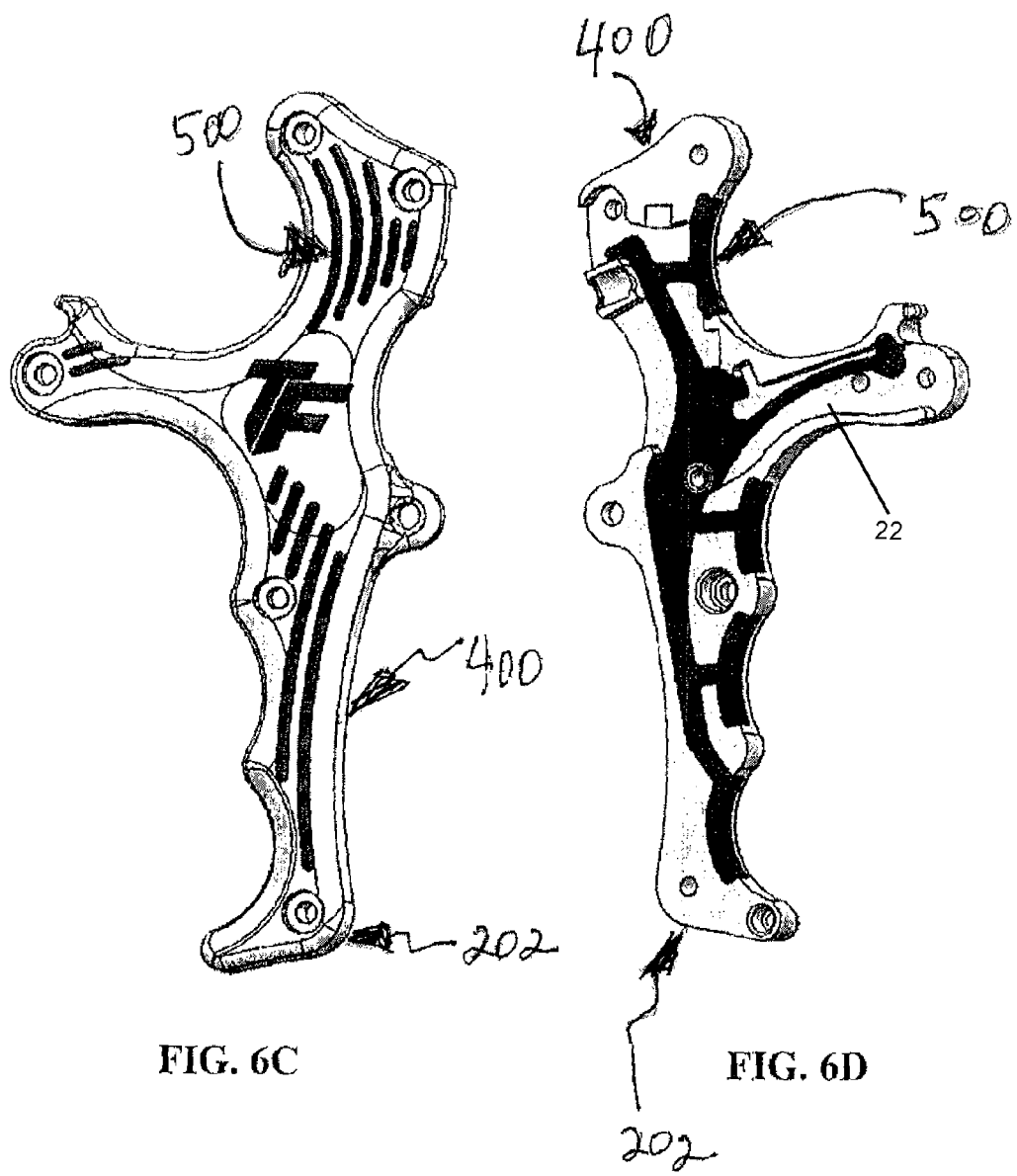
FIG. 6C is another view of FIG. 6A differentiating the substrate subassembly and the overmolding material from each other.
FIG. 6D is another view of FIG. 6B differentiating the substrate subassembly and the overmolding material from each other.
Figure 6E:
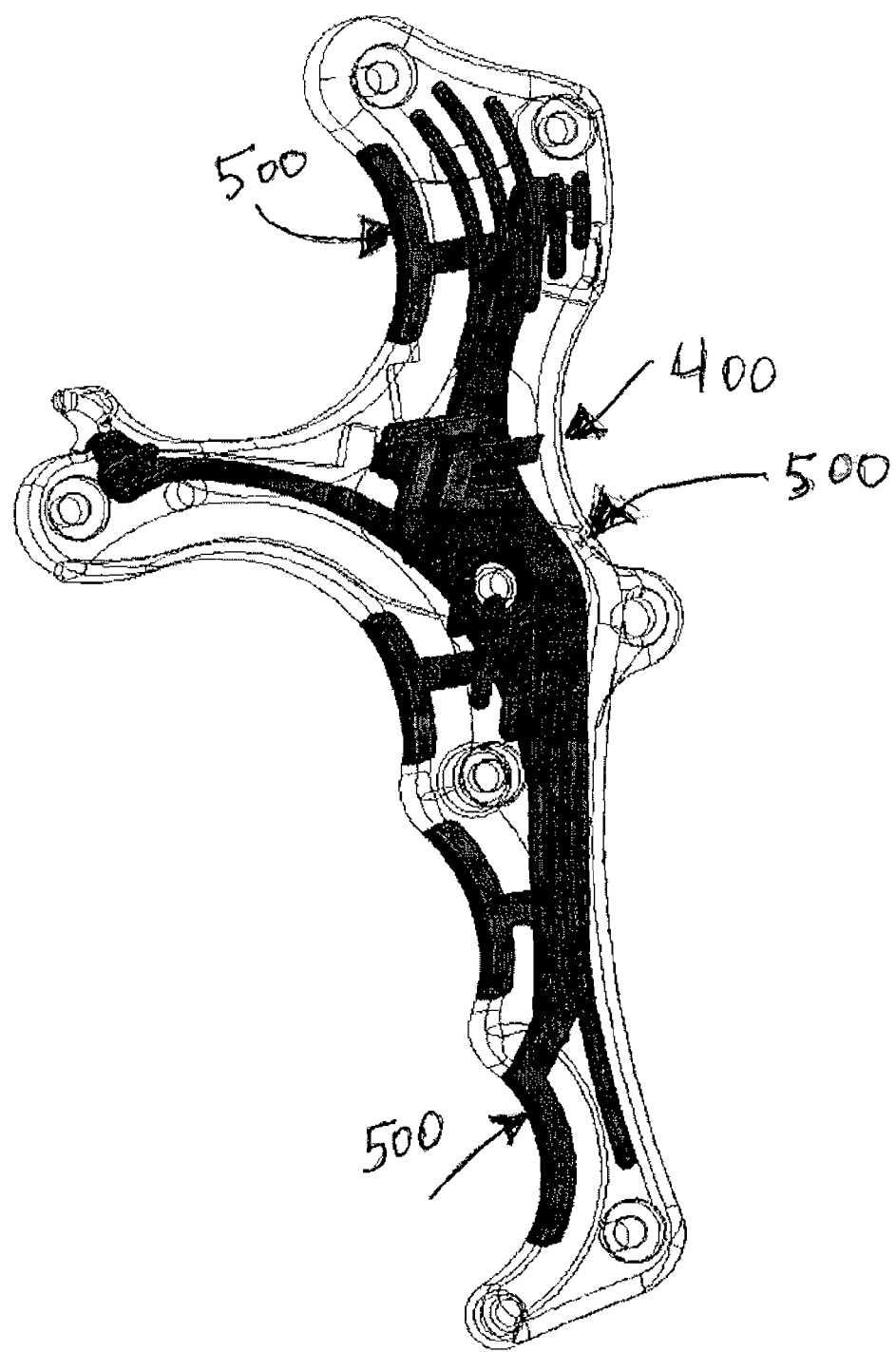
FIG. 6E illustrates the overmolding material in the front portion of FIG. 6C as "seen through" the substrate subassembly.
Figure 6F:
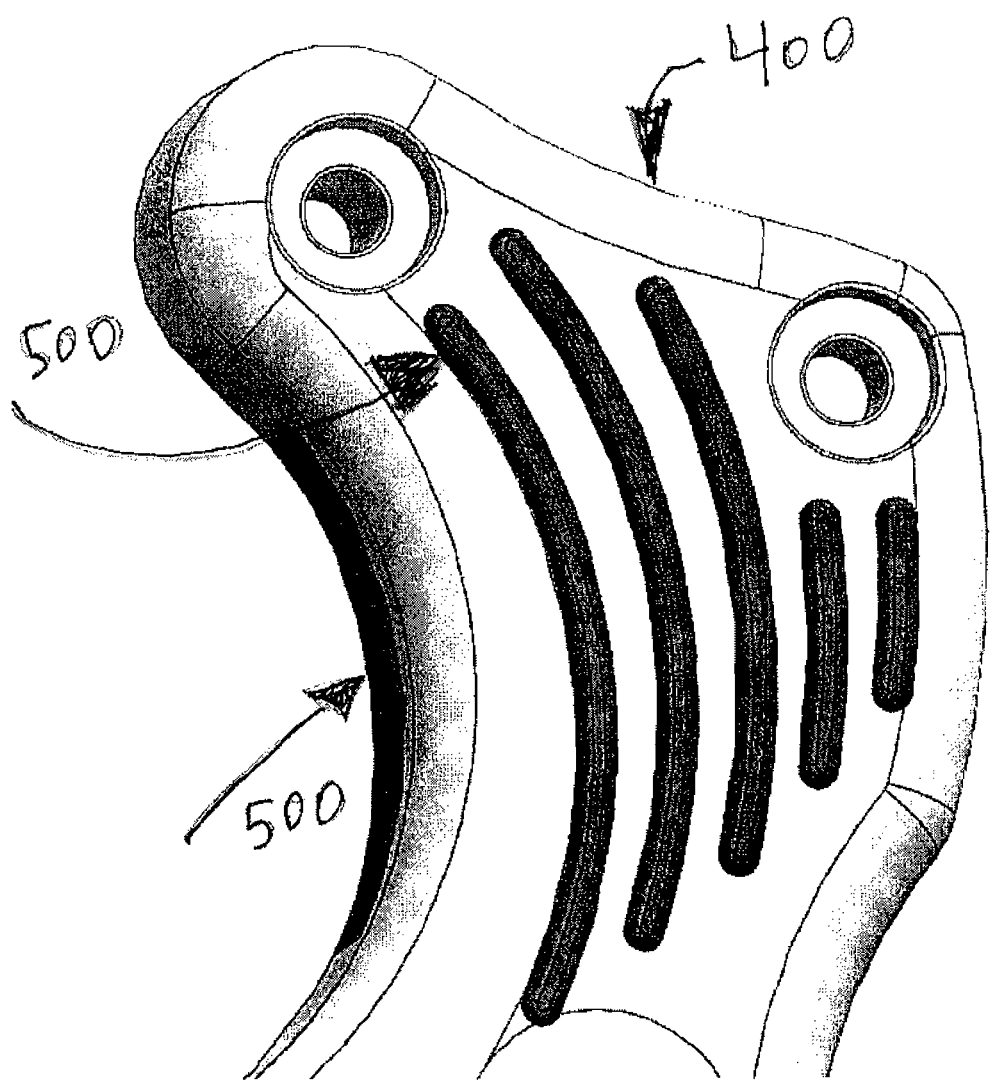
FIG. 6F is a close-up view of an upper section of the archery release illustrated in FIG. 6C.
Figure 6G:
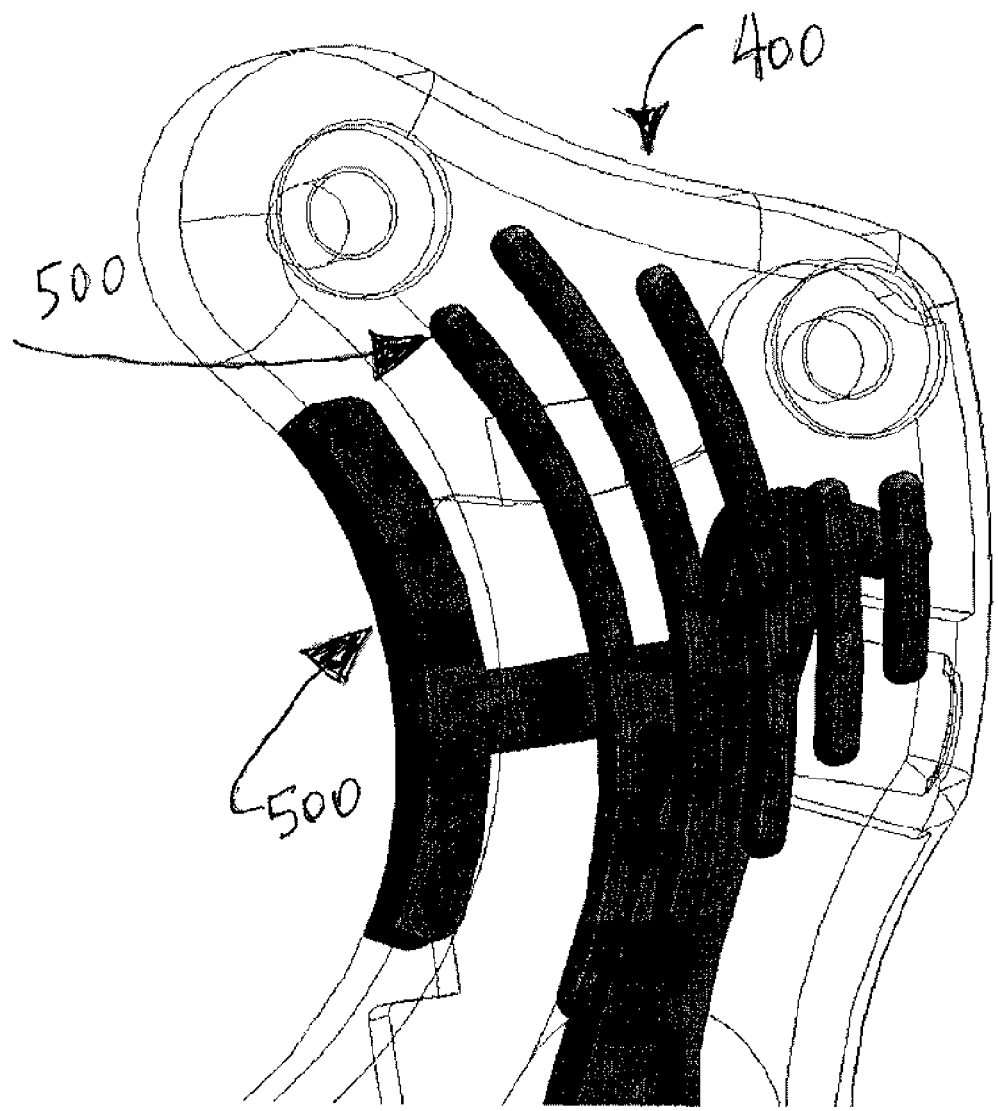
FIG. 6G is a close-up view of an upper section of the archery release illustrated in FIG. 6E.
Figure 6H:
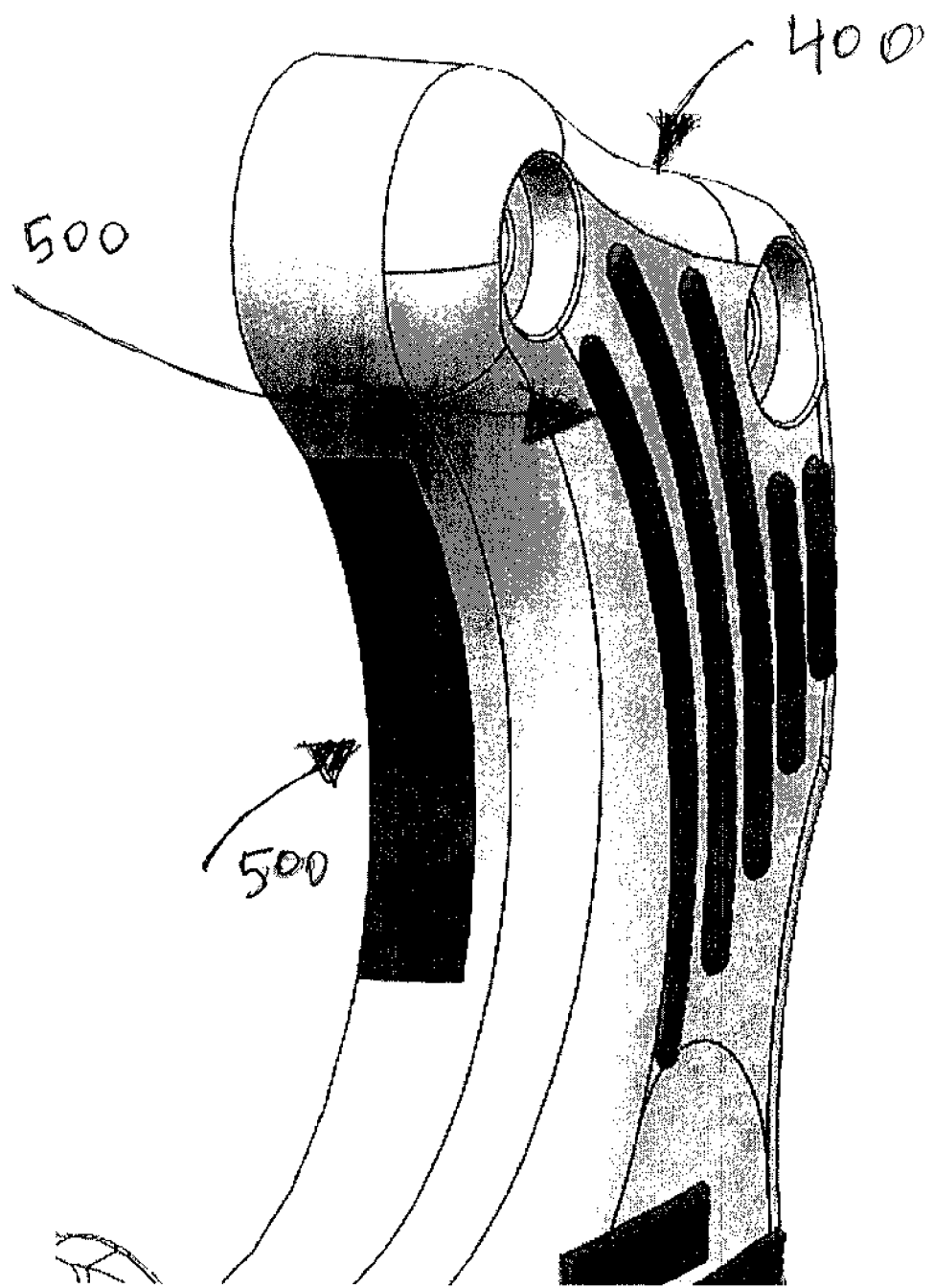
FIG. 6H is a perspective view of FIG. 6F.
Figure 6I:
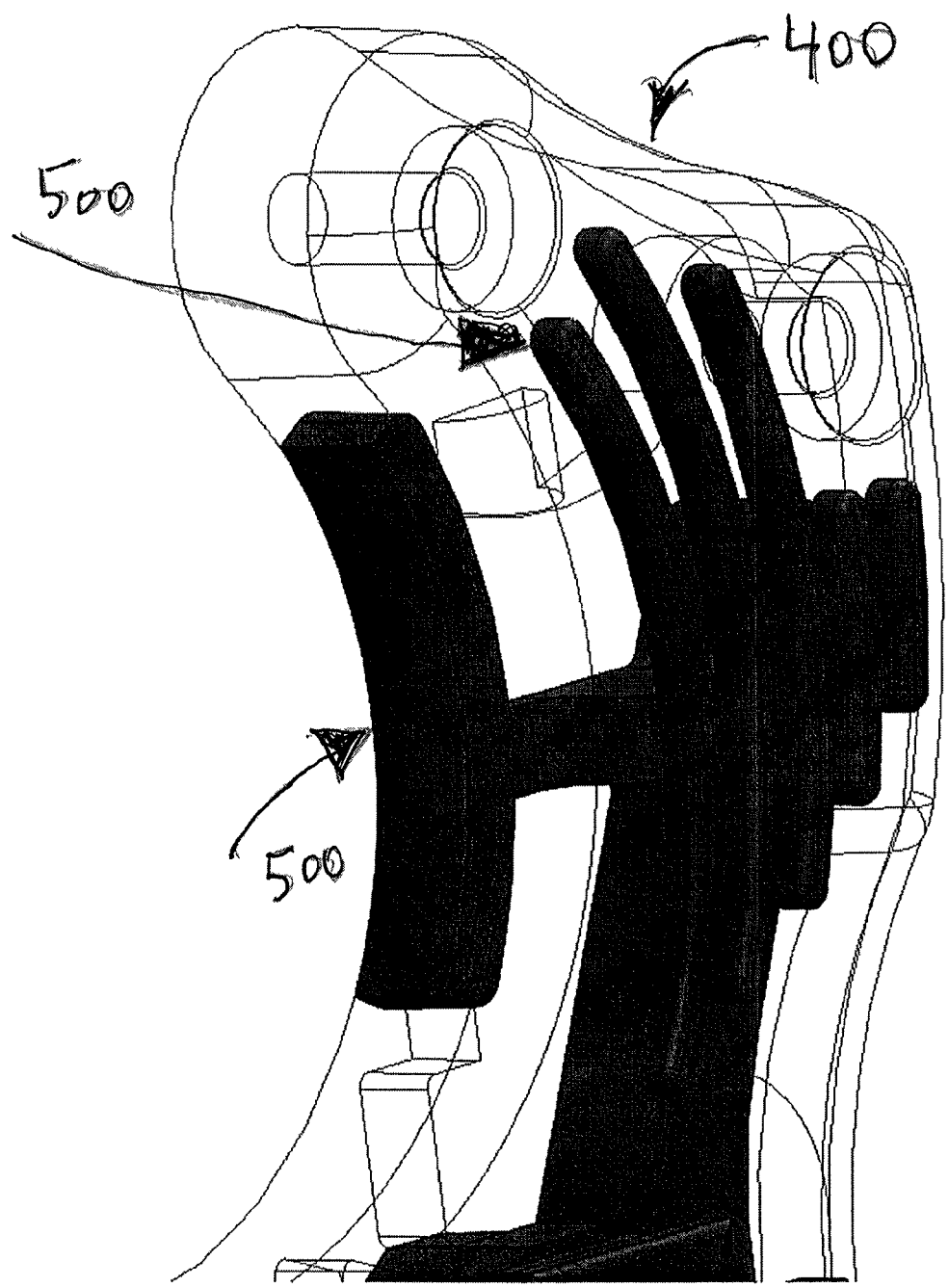
FIG. 6I is a perspective view of FIG. 6G.
Figure 6J:
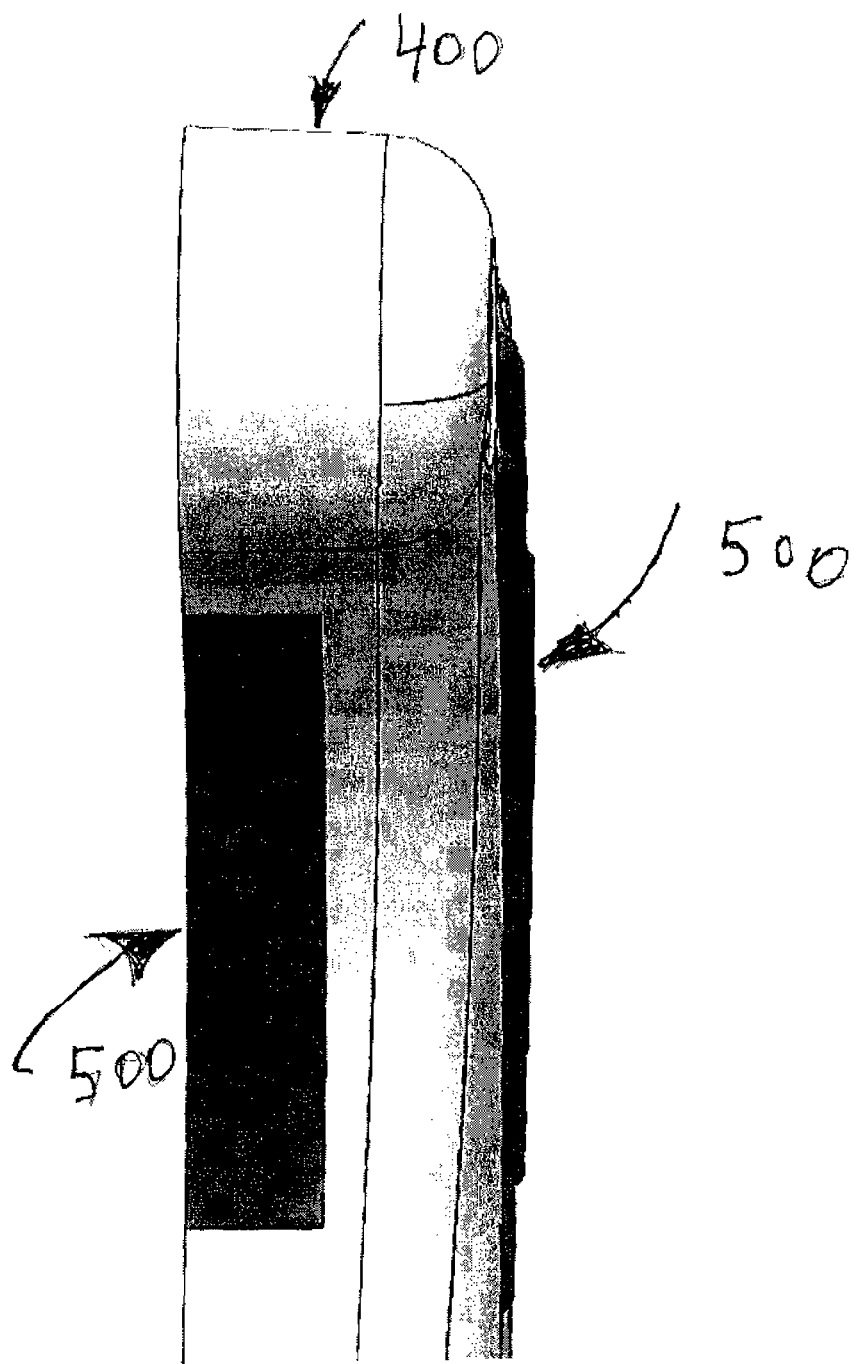
FIG. 6J is an elevation of FIGS. 6F and 6H.
Figure 6K:
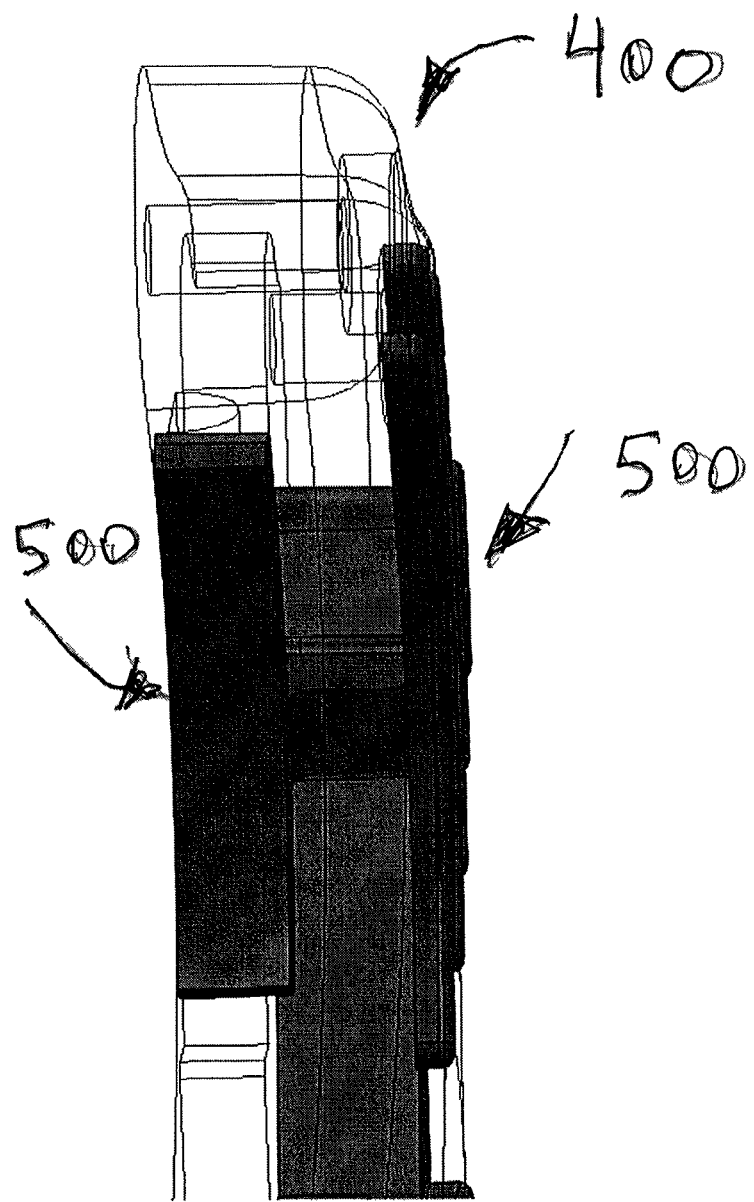
FIG. 6K is an elevation of FIGS. 6G and 6I.
Figure 6L:
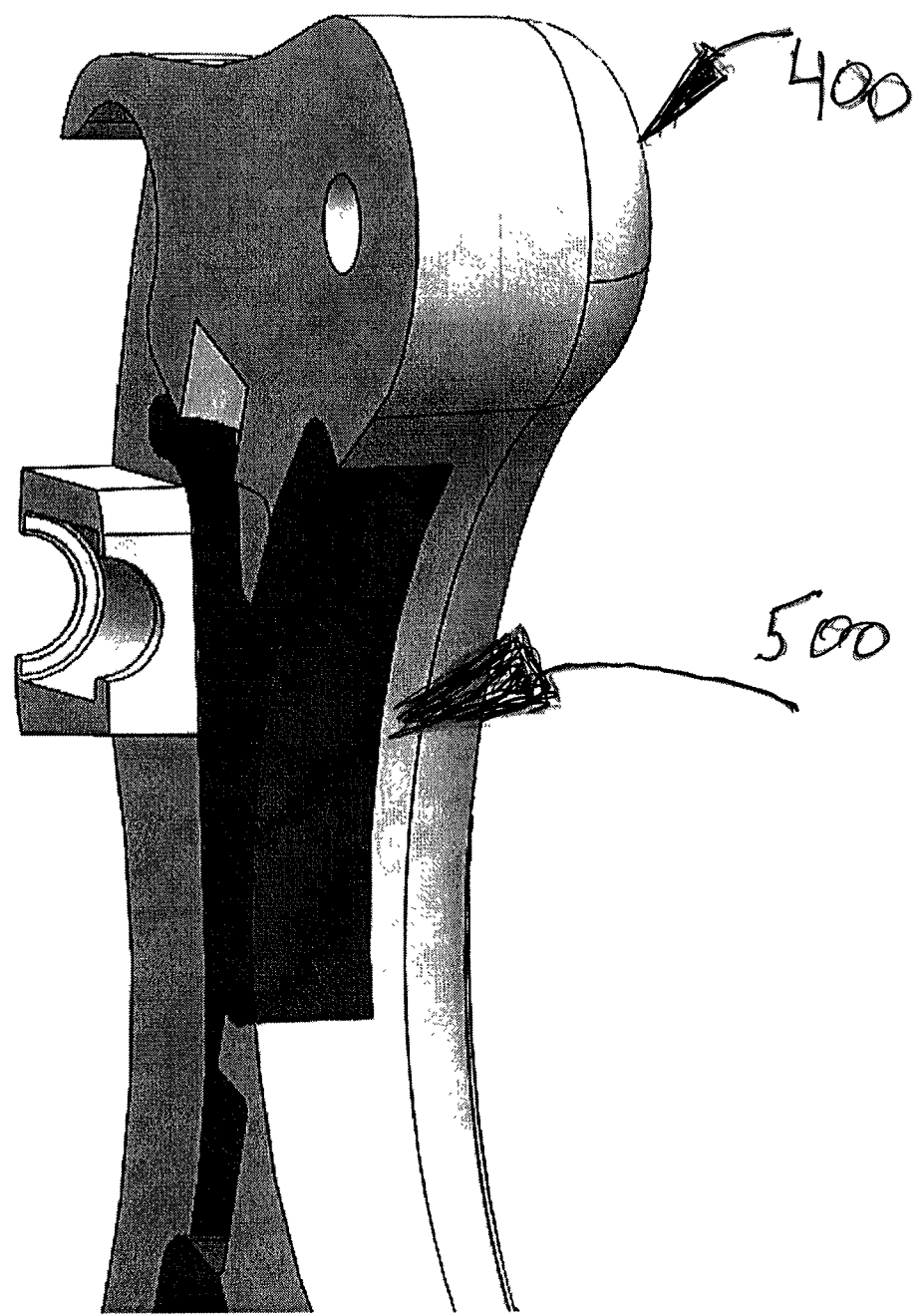
FIG. 6L is an illustration of FIGS. 6F and 6H as viewed from the left.
Figure 6M:
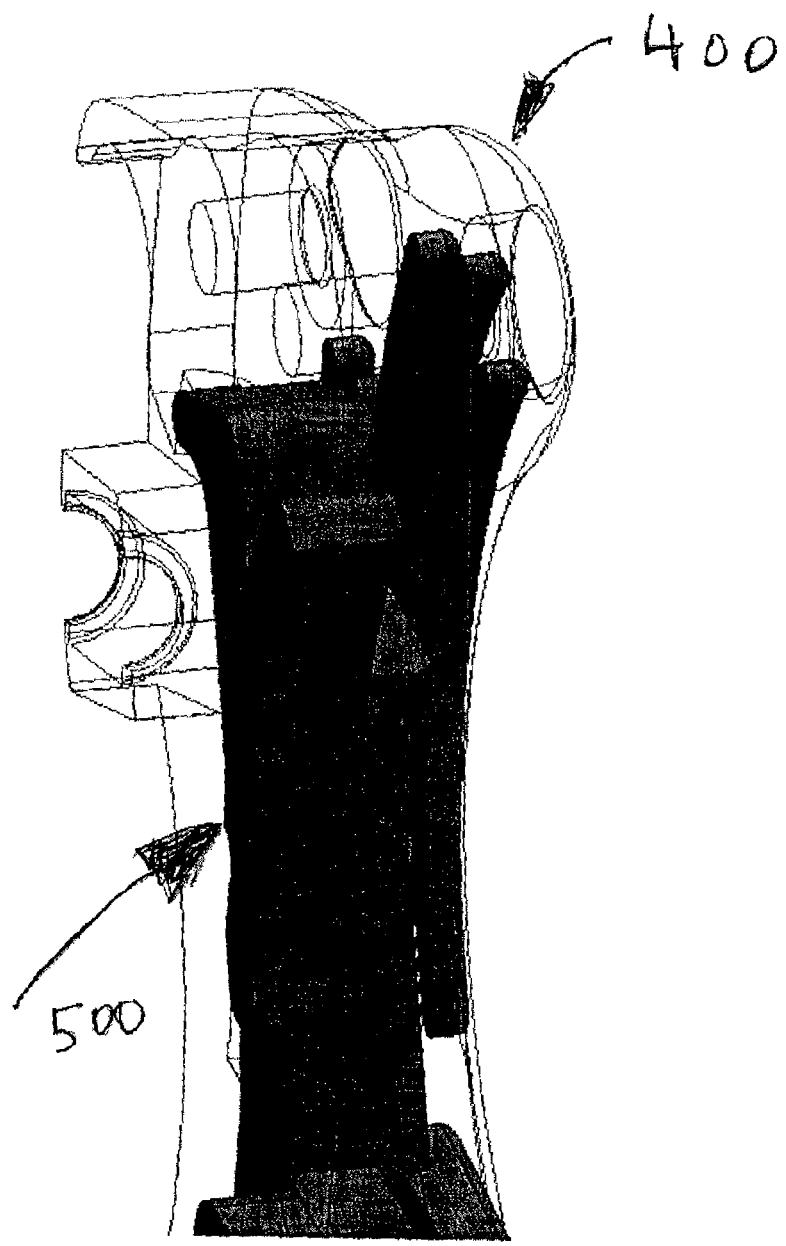
FIG. 6M is an illustration of FIGS. 6G and 6I as viewed from the left.
Figure 6N:
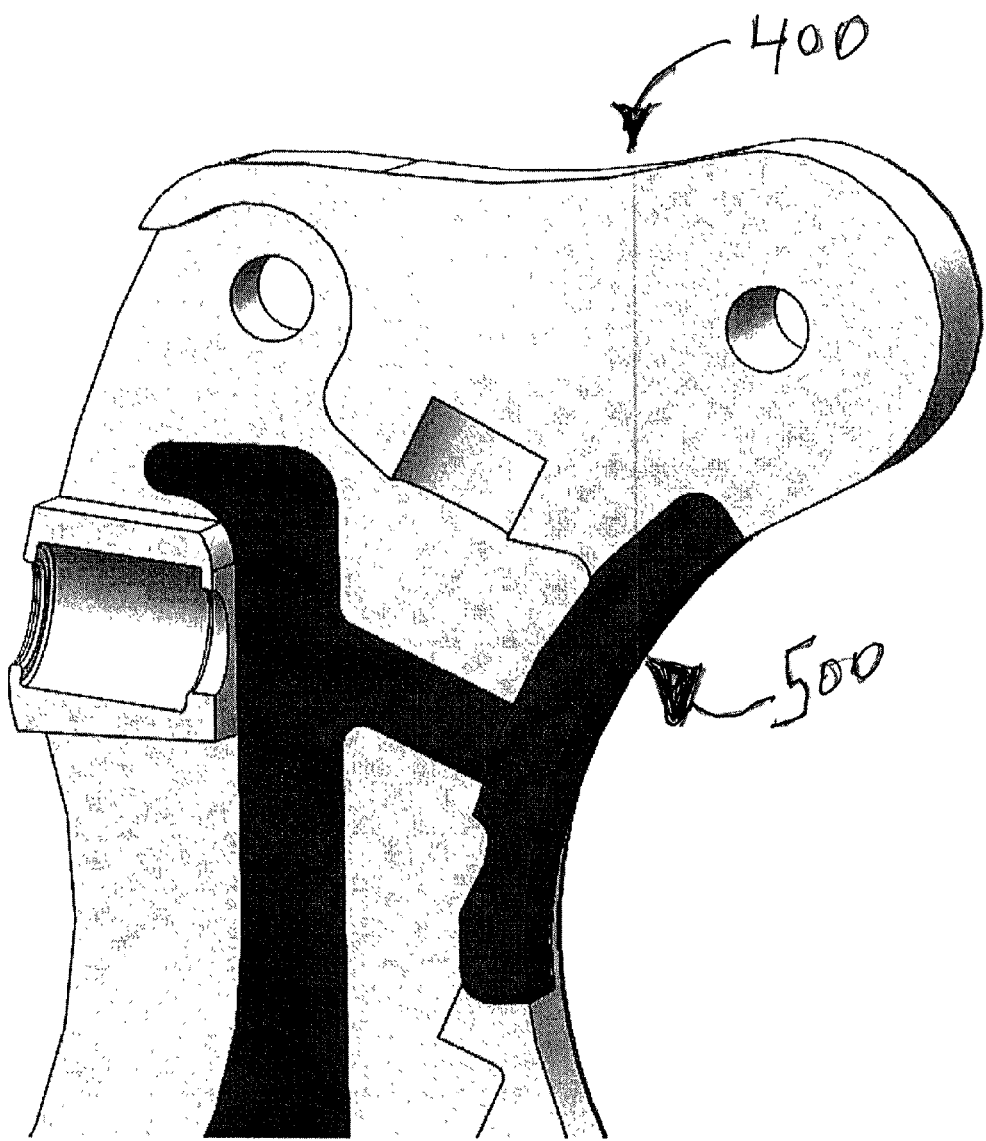
FIG. 6N illustrates the back side (or interior) of the upper section illustrated in FIGS. 6F, 6H, 6J and 6L.
Figure 6O:
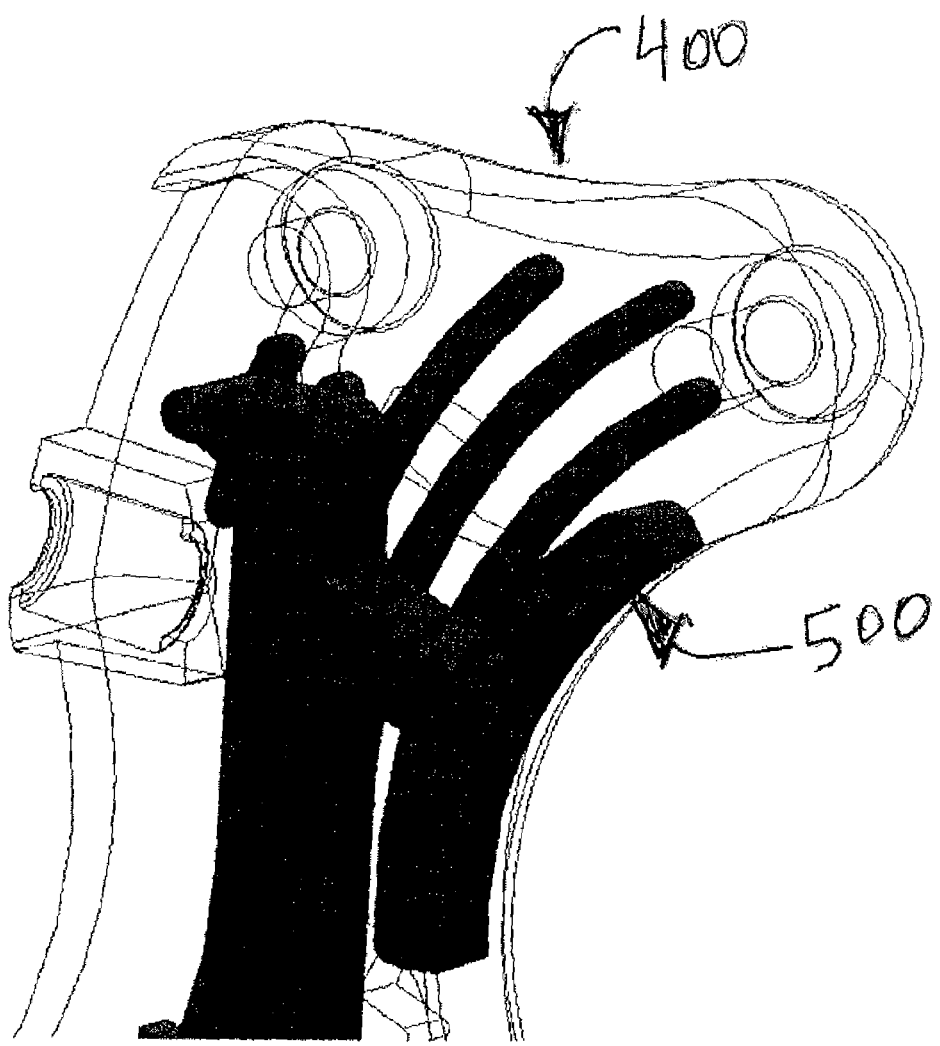
FIG. 6O illustrates the back side (or interior) of the upper section illustrated in FIGS. 6G, 6I, 6K and 6M.

FIG. 6A is a perspective view of the front or external side, i.e., a front perspective or isometric view, of the front portion 202 after it has been manufactured, i.e., after the overmolding process. In other words, FIG. 6A illustrates the front portion 202 after the substrate subassembly 400 of FIG. 4A has been overmolded by the overmolding material 500 in the shape or manner illustrated in FIG. 5A. Thus, FIG. 6A illustrates the composite front portion 202 ready for assembling the handle 110. FIG. 6B is a perspective view of the back or internal side, i.e., a back perspective or isometric view, of the front portion 202 illustrated in FIG. 6A. It should be understood that the term "back or internal side" is used to reference the side of the front portion 202 which will be inside the handle 110. FIGS. 6C and 6D illustrate the front portion 202 of FIGS. 6A and 6B, respectively, with different shadings for the substrate subassembly 400 and for the overmolding material 500 for clearly illustrating the sections or portions of the composite front portion 202 defined by the substrate subassembly 400 and the sections or portions defined by the overmolding material 500. FIG. 6E illustrates the front portion 202 of FIG. 6C as "seen through" a transparent substrate subassembly 400. As such, FIG. 6E illustrates the overmolding material 500 that is not visible in the front portion 202 illustrated in FIG. 6C. FIG. 6F is a close-up view of an upper section of the front portion 202 illustrated in FIG. 6C. FIG. 6G is a close-up view of an upper section of the front portion 202 illustrated in FIG. 6E. FIGS. 6H and 6I, respectively, are perspective views of the close-up section illustrated in FIGS. 6F and 6G. FIGS. 6J and 6K are elevational views of the close-up section illustrated in FIGS. 6H and 6I, respectively. FIG. 6L is an illustration of FIGS. 6F and 6H as viewed from the left; and FIG. 6M is an illustration of FIGS. 6G and 6I as viewed from the left. FIG. 6N illustrates the back (or interior) side of the upper section illustrated in FIGS. 6F, 6H, 6J and 6L; and FIG. 6O illustrates the back side (or interior) of the upper section illustrated in FIGS. 6G, 6I, 6K and 6M.

As stated elsewhere, vibrations and sound are typically generated when the mechanical components within the body of the archery release 100 strike the substrate subassembly 400, for example, in the absence of the overmolded material 500. FIGS. 7A-7F illustrate non-limiting exemplary locations whereat the overmolding material 500 prevents hard impact between the substrate subassembly 400 and the mechanical components of the latching assembly 120 and of the release mechanism 130 that are housed within the handle 110. Without the overmolding material 500, the impact between the substrate subassembly 400 and the mechanical components generates vibrations and noise. With the overmolding material 500 in place, these impacts are eliminated or substantially mitigated, resulting in the elimination or minimization of the vibrations and sound.

Figure 7A:
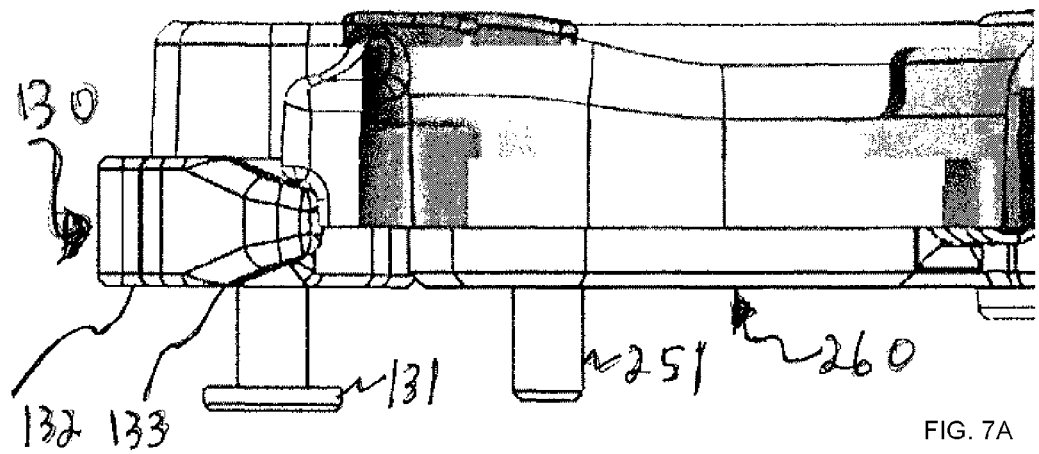
FIG. 7A is a top view of a portion of a non-limiting exemplary embodiment of a bowstring release mechanism and the overmolding material in the vicinity thereof for the archery release illustrated in FIG. 1.
Figure 7B:
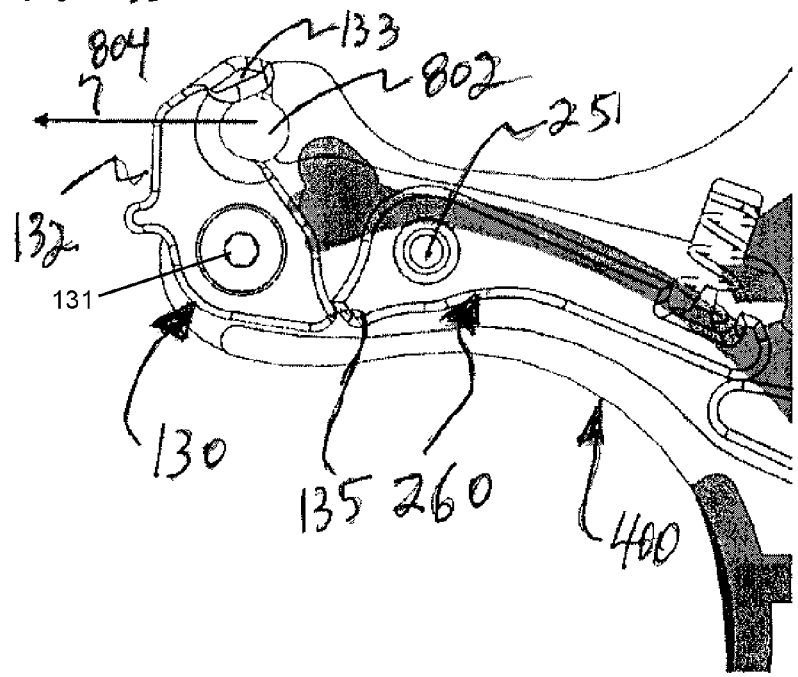
FIG. 7B is a perspective view of FIG. 7A illustrating the release mechanism in the pre-shoot position before the bowstring is released.
Figure 7C:
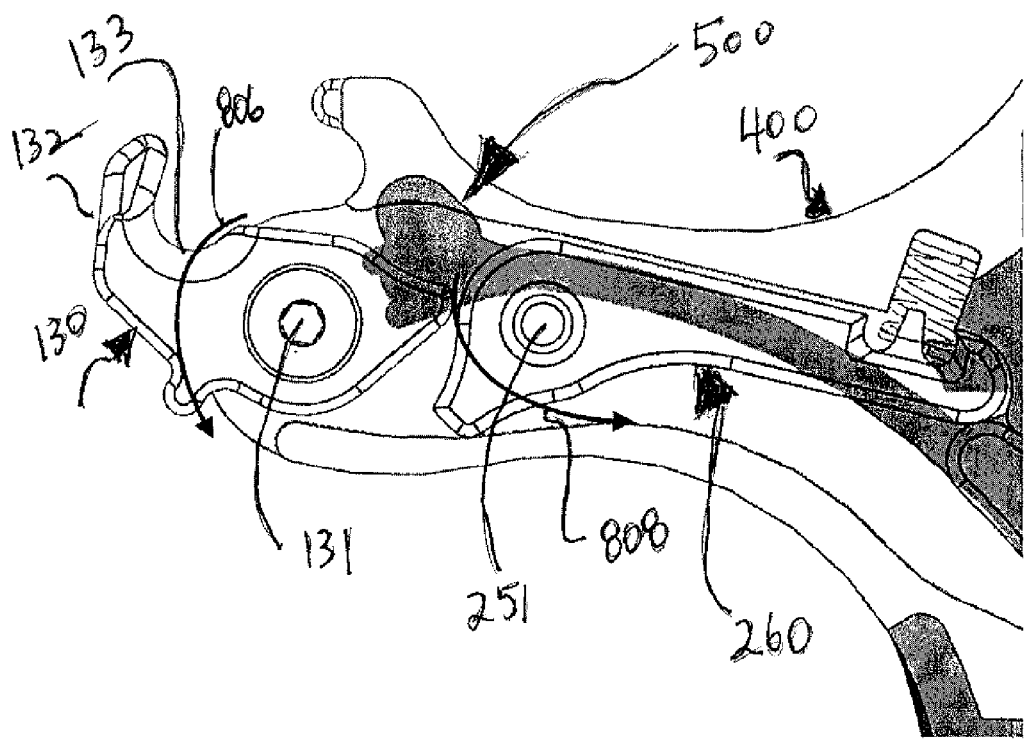
FIG. 7C is a perspective view of FIG. 7A illustrating the release mechanism in a post-shoot position after the bowstring is released.

FIG. 7A is a partial top view of the release mechanism 130 illustrating the internally located lever arm 260 and overmolding material 500. FIG. 7B illustrates the front or externally facing side of a portion of the release mechanism 130 illustrating the internally located lever arm 260 and overmolding material 500 when the bowstring 802 is drawn and the archery release 100 is in the pre-shoot locked position. As such, the release mechanism 130 and the lever arm 260 are illustrated in a locked position with the drawn bowstring 802 exerting a force on the bowstring hook 133 in the direction shown by the arrow 804. In the pre-shoot locked position, at least a portion at an end of the lever arm 260 and at least a portion of the hinged release 132 engage each other at the location illustrated by the numeral 135. As such, the lever arm 260 inhibits rotation of the hinged release 132 about the hinged pin 131, and the bowstring 802 is retained or held drawn by the bowstring hook 133. As illustrated in FIG. 7C, when the archer operates the trigger 180, the lever 260 rotates about the sleeve 251 in the direction shown by the arrow 808 and, at the location illustrated by the numeral 135, the end of the lever arm 260 and the hinged release 132 disengage from each other. The force exerted on the bowstring hook 133 by the drawn bowstring 802 causes the hinged release 132 to rotate about the hinged pin 131 in the direction shown by the arrow 806, and the bowstring 802 is released to propel the arrow towards the target.

Figure 7D:
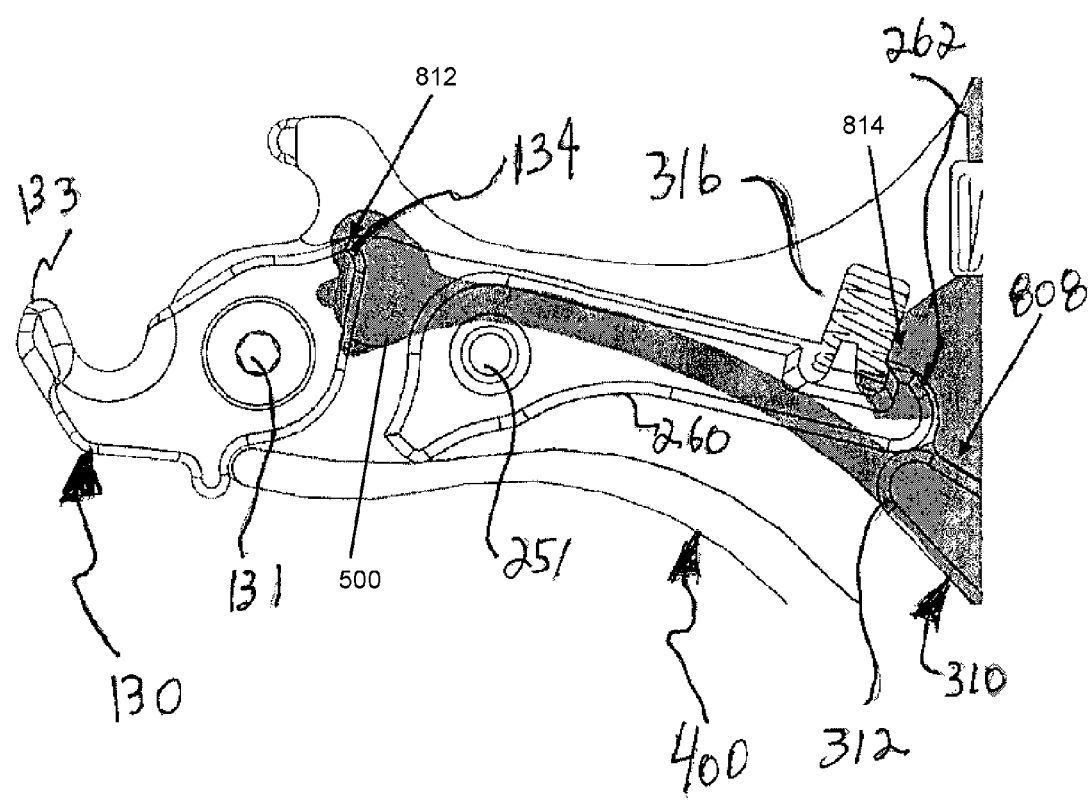
FIG. 7D illustrates some non-limiting exemplary locations whereat the internal mechanical components of the archery release of FIGS. 1 and 2 collide with the overmolding material instead of which the substrate subassembly.

FIG. 7D shows non-limiting exemplary locations within the substrate subassembly 400 whereat the overmolded material 500 fully absorbs, or at least dampens, the vibrations and sound that would be generated if the internal mechanical components were permitted to strike the substrate subassembly 400 in the absence of the overmolded material 500. For example, at the location illustrated by the numeral 812, overmolding material 500 is molded in place within the substrate subassembly 400 to prevent a portion 134 of the hinged release 132 from colliding with the substrate subassembly 400. When the trigger 180 is operated, the hinged release 132, including the portion 134, rotates about the hinged pin 131 in the direction shown by the arrow 806, and the portion 134 interacts with the overmolding material 500 which absorbs all, or at least dampens, the vibrations and sound. Additionally, at the location illustrated by the numeral 814, an end portion 262 of the lever arm 260 contacts the overmolding material 500 interposed between the biasing element 316, such as a spring for example, and the lever arm 260. Also, at the location illustrated by the arrow 808, an end portion 312 of the thumb sear assembly 310 contacts the overmolding material 500 interposed between the end portion 312 and the end portion 262.

Figure 7E:
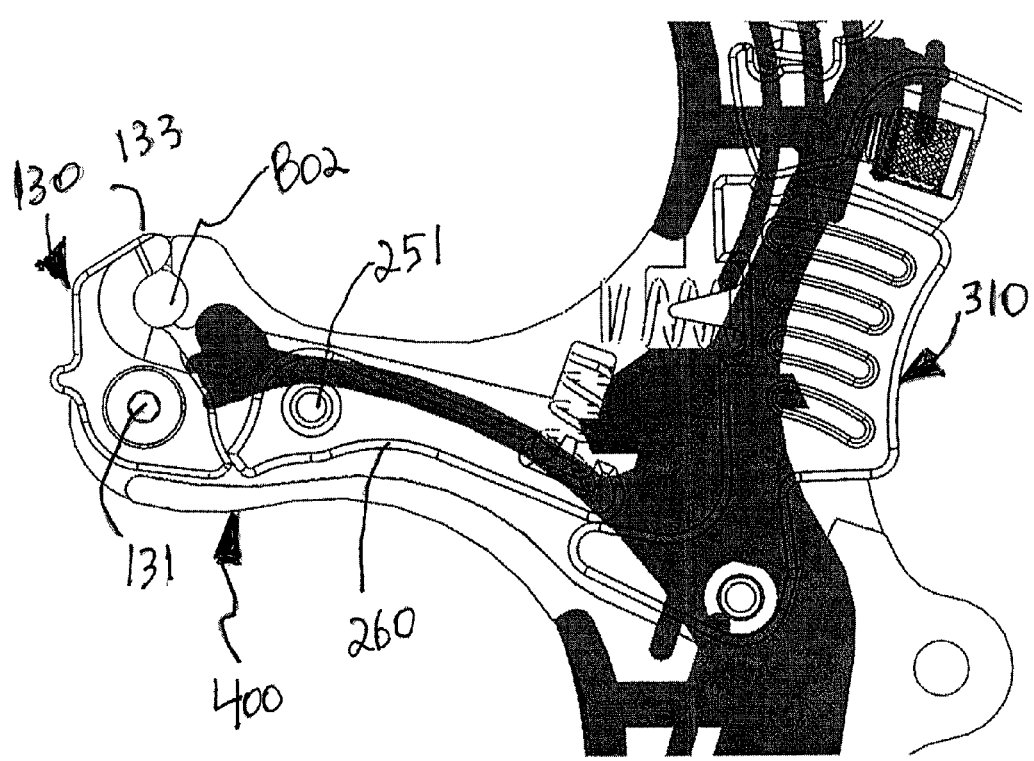
FIG. 7E shows the interior of at least a portion of the archery release illustrating the relative locations of at least some of the internal components and the overmolding material when the archery release is a pre-shook locked position.
Figure 7F:
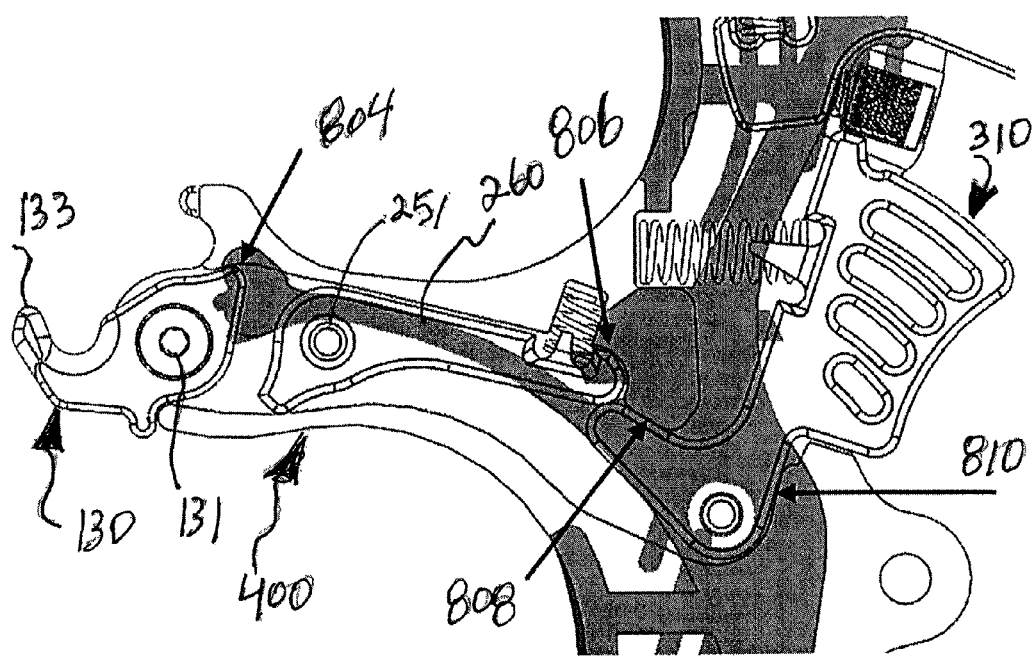
FIG. 7F shows the interior of at least a portion of the archery release illustrating the relative locations of at least some of the internal components and the overmolding material when the archery release is a post-shook position.

FIG. 7E illustrates at least some of the internal components of portions of the latching assembly 120 and the release mechanism 130 in the pre-shoot position. FIG. 7F illustrates at least some of the internal components of portions of the latching assembly 120 and the release mechanism 130 in the post-shoot position. FIGS. 7E and 7F illustrate additional non-limiting exemplary locations whereat the internal mechanical components associated with the latching assembly 120 and with the release mechanism 130 collide with the overmolding material 500 for eliminating, or at lease decreasing, the vibrations and sound generated when using the archery release 100. For example, at the location illustrated by the arrow 810, a portion of the thumb sear assembly 310 collides with or contacts the overmolding material 500 interposed between the thumb sear assembly 310 and the substrate subassembly 400.

While the disclosure illustrates and describes non-limiting exemplary embodiments of an archery release, it will be apparent that various changes may be made and/or equivalents may be substituted without departing from the spirit, scope and intent thereof. For instance, while the disclosure illustrates a hand-held archery release, it is equally applicable for alternate forms or types of archery release such as, but not limited to, a wrist-strap archery release.

Furthermore, modifications and/or alternative configurations of the embodiments illustrated and described herein may become apparent or obvious. All such variations are considered as being within the metes and bounds of the instant disclosure. For instance, while reference may have been made to particular feature(s) and/or function(s), the disclosure is considered to also include embodiments configured for functioning and/or providing functionalities similar to those described herein with reference to the accompanying drawings. Accordingly, the spirit, scope and intent of the instant disclosure is to embrace all such variations and/or equivalents.

What is claimed is:

1. An archery release, comprising:
   a handle, comprising substantially symmetrical front and rear portions, the front and rear portions each comprising:
   a substrate subassembly, comprising:
   an exterior surface;
   spaced-apart front and back sides;
   a cavity in the back side; and
   one or more troughs on the exterior surface, wherein each of the one or more troughs and the cavity are connected by at least one passage;
   an overmolding material disposed within:
   at least a portion of the cavity;
   each of the one or more troughs; and
   each of the at least one passage; and
   a hollow interior defined at least in part by the portion of the cavity devoid of the overmolding material;
   a trigger extending into the interior of the handle;
   a release mechanism extending into the interior of the handle, the release mechanism comprising a bowstring hook; and
   a latching assembly extending into the interior of the handle, wherein the latching assembly is operably coupled to the trigger and to the release mechanism within the interior of the handle.

2. The archery release of claim 1, wherein the trigger, the release mechanism and the latching assembly are configured to hold the release mechanism in a pre-shoot position with the bowstring hook in a locked position.

3. The archery release of claim 2, wherein operating the trigger to a firing position releases the release mechanism from the pre-shoot position to a post-shoot position with the bowstring hook in an unlocked position.

4. The archery release of claim 3, wherein a force required for operating ("pulling") the trigger is adjustable.

5. The archery release of claim 3, wherein a distance travelled by the trigger is adjustable.

6. The archery release of claim 3, wherein a trigger position relative to the handle is adjustable.

7. The archery release of claim 3, wherein a trigger position relative to the latching assembly is adjustable.

8. The archery release of claim 3, wherein the overmolding material comprises a composition that absorbs at least a portion of vibrations and/or noise generated when the trigger is operated.

9. The archery release of claim 8, wherein all vibrations and/or noise is absorbed by the overmolded material.

10. The archery release of claim 8, wherein one or more components of the trigger contacts the overmolding material.

11. The archery release of claim 8, wherein one or more components of the release mechanism contacts the overmolding material.

12. The archery release of claim 8, wherein one or more components of the latching assembly contacts the overmolding material.

13. The archery release of claim 1, wherein the substrate subassembly is composed of a material that bonds with the overmolding material.

14. The archery release of claim 13, wherein the overmolding material in the one or more troughs mechanically interlocks with the substrate subassembly.

15. The archery release of claim 1, wherein the overmolding material comprises an elastomer.

* * * * *